(12) United States Patent
Zhao et al.

(10) Patent No.: US 11,991,023 B2
(45) Date of Patent: May 21, 2024

(54) PATH CONSTRUCTION METHOD AND RELATED DEVICE

(71) Applicant: ZTE Corporation, Shenzhen (CN)

(72) Inventors: Detao Zhao, Shenzhen (CN); Shaofu Peng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 70 days.

(21) Appl. No.: 17/297,332

(22) PCT Filed: Aug. 30, 2019

(86) PCT No.: PCT/CN2019/103466
§ 371 (c)(1),
(2) Date: May 26, 2021

(87) PCT Pub. No.: WO2020/107977
PCT Pub. Date: Jun. 4, 2020

(65) Prior Publication Data
US 2022/0014394 A1 Jan. 13, 2022

(30) Foreign Application Priority Data
Nov. 27, 2018 (CN) .......................... 201811426164.5

(51) Int. Cl.
*H04L 12/46* (2006.01)
*H04L 45/02* (2022.01)
*H04L 45/50* (2022.01)

(52) U.S. Cl.
CPC .......... *H04L 12/4641* (2013.01); *H04L 45/04* (2013.01); *H04L 45/50* (2013.01)

(58) Field of Classification Search
None
See application file for complete search history.

(56) References Cited

U.S. PATENT DOCUMENTS 7,742,477 B1 * 6/2010 Guichard ............... H04L 45/50
370/395.31
9,178,809 B1 11/2015 Shen et al.
(Continued)

FOREIGN PATENT DOCUMENTS

CN 101106519 A 1/2008
CN 102647328 A 8/2012
(Continued)

OTHER PUBLICATIONS

Swallow, George and Guichard, Jim, "Network Scaling with Aggregate LSPs," Network Working Group, Jul. 7, 2008 (Year: 2008).*
(Continued)

*Primary Examiner* — Benjamin Lamont
(74) *Attorney, Agent, or Firm* — Vivacqua Crane, PLLC

(57) ABSTRACT

A path construction method and related devices are disclosed. The method may include: advertising, by a second PE node, a first VPN route to a first PE node through an MP-BGP signaling channel, such that the first PE node is able to determine a label forwarding path to a first VPN Prefix based on a first transmission path descriptor (TPD) carried in the first VPN route received; where the first TPD is configured to identify the label forwarding path for a first VPN message to reach a BGP next hop.

19 Claims, 13 Drawing Sheets

(56) References Cited

U.S. PATENT DOCUMENTS

| | | | |
|---|---|---|---|
| 2006/0088031 A1 | 4/2006 | Nalawade | |
| 2007/0025377 A1* | 2/2007 | Charny | H04L 45/50 370/409 |
| 2009/0003350 A1* | 1/2009 | Guichard | H04L 45/50 370/392 |
| 2010/0008361 A1* | 1/2010 | Guichard | H04L 45/50 370/392 |
| 2011/0199891 A1* | 8/2011 | Chen | H04L 45/22 370/255 |
| 2014/0095678 A1* | 4/2014 | Allan | H04L 41/0869 709/220 |
| 2017/0289032 A1 | 10/2017 | Guichard et al. | |
| 2021/0218682 A1* | 7/2021 | Ceccarelli | H04L 12/4641 |

FOREIGN PATENT DOCUMENTS

| | | |
|---|---|---|
| CN | 106027391 A | 10/2016 |
| CN | 106713320 A | 10/2017 |
| WO | 2007106484 A2 | 9/2007 |

OTHER PUBLICATIONS

Gredler, H. et al., Egress Peer Engineering using BGP-LU, Inter-Domain Routing, Oct. 6, 2017 (Year: 2017).*

The State Intellectual Property Office of People's Republic of China. First Office Action for CN Application No. 201811426164.5 and English translation, dated Jan. 27, 2022, pp. 1-13.

The State Intellectual Property Office of People's Republic of China. First Search Report for CN Application No. 201811426164.5 and English translation, dated Jan. 20, 2022, pp. 1-4.

European Patent Office. Extended European Search Report for EP Application No. 19888731.7, dated Dec. 23, 2021, pp. 1-9.

Bashandy, et al. "BGP FRR Protection against Edge Node Failure Using Vector Labels," IETF Network Working Group, issued Jul. 7, 2012, pp. 1-32.

Bashandy, et al. "BGP Prefix Independent Convergence," IETF Network Working Group, issued Nov. 22, 2016, pp. 1-30.

Pathak, et al. "Inter-AS Option D for BGP/MPLS IP VPN," IETF Network Working Group, issued Oct. 8, 2014, pp. 1-15.

Chiussi, et al. "Framework for QoS in Provider-Provisioned VPNs," IETF Provider Provisioned Working Group, issued Mar. 2003, pp. 1-41.

Tang, et al. "MPBGP extensions on open source routing software XORP," Tshingua University Department of Science and Technology, issued Nov. 2009, pp. 1901-1904, vol. 49, No. 11.

Cisco Systems et al. "BGP Prefix independent Convergence Draft-ietf-rtgwg-bgp-pic-05.txt" "Network Working Group Internet Draft", May 25, 2017 (May 25, 2017), Entire Document.

International Search Report and Written Opinion for the International Patent Application No. PCT/CN2019/103466 dated Dec. 5, 2019.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   TLV Type    |      Length           |    TPD Type           |
+-+-+-+-+-+-+-+-+-+-+-+-+-+-+-+-+-+-+-+-+-+-+-+-+-+-+-+-+-+-+-+-+
|P|       Flags                 |           RESERVED            |
+-+-+-+-+-+-+-+-+-+-+-+-+-+-+-+-+-+-+-+-+-+-+-+-+-+-+-+-+-+-+-+-+
|                           Sub-TLVs                            |
+-+-+-+-+-+-+-+-+-+-+-+-+-+-+-+-+-+-+-+-+-+-+-+-+-+-+-+-+-+-+-+-+
```

FIG. 4.1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-TLV Type  | Sub-TLV Length|           RESERVED            |
+-+-+-+-+-+-+-+-+-+-+-+-+-+-+-+-+-+-+-+-+-+-+-+-+-+-+-+-+-+-+-+-+
|                            Color                              |
+-+-+-+-+-+-+-+-+-+-+-+-+-+-+-+-+-+-+-+-+-+-+-+-+-+-+-+-+-+-+-+-+
```

FIG. 4.2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-TLV Type  | Sub-TLV Length| Algorithm     |   RESERVED    |
+-+-+-+-+-+-+-+-+-+-+-+-+-+-+-+-+-+-+-+-+-+-+-+-+-+-+-+-+-+-+-+-+
```

FIG. 4.3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-TLV Type  | Sub-TLV Length|           RESERVED            |
+-+-+-+-+-+-+-+-+-+-+-+-+-+-+-+-+-+-+-+-+-+-+-+-+-+-+-+-+-+-+-+-+
|                        Network Slice ID                       |
+-+-+-+-+-+-+-+-+-+-+-+-+-+-+-+-+-+-+-+-+-+-+-+-+-+-+-+-+-+-+-+-+
```

FIG. 4.4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-TLV Type  | Sub-TLV Length|           RESERVED            |
+-+-+-+-+-+-+-+-+-+-+-+-+-+-+-+-+-+-+-+-+-+-+-+-+-+-+-+-+-+-+-+-+
|           Label               |           RESERVED            |
+-+-+-+-+-+-+-+-+-+-+-+-+-+-+-+-+-+-+-+-+-+-+-+-+-+-+-+-+-+-+-+-+
```

FIG. 4.5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Sub-TLV Type  | Sub-TLV Length|            Flags              |
+-+-+-+-+-+-+-+-+-+-+-+-+-+-+-+-+-+-+-+-+-+-+-+-+-+-+-+-+-+-+-+-+
|                          Label Index                           |
+-+-+-+-+-+-+-+-+-+-+-+-+-+-+-+-+-+-+-+-+-+-+-+-+-+-+-+-+-+-+-+-+
```

FIG. 4.6

PATH CONSTRUCTION METHOD AND RELATED DEVICE

CROSS-REFERENCE TO RELATED APPLICATION

This application is a national stage filing under 35 U.S.C. § 371 of international application number PCT/CN2019/103466, filed Aug. 30, 2019, which claims priority to Chinese patent application No. 201811426164.5, filed Nov. 27, 2018. The contents of these applications are incorporated herein by reference in their entirety.

TECHNICAL FIELD

Embodiments of the present disclosure relate to, but are not limited to, the BGP/MPLS VPN technology, and in particular to a path construction method and related devices.

BACKGROUND

A BGP Labeled unicast (BGP-LU) mechanism provides a way to establish a Multiprotocol Label Switching-Label Switch Path (MPLS LSP) for Border Gateway Protocol (BGP) Prefix. This mechanism enables the establishment of an end-to-end MPLS LSP across an autonomous system (AS) and Interior Gateway Protocol (IGP) domains in MPLS Virtual Private Network (MPLS VPN) service deployments through advertising routers via BGP and binding of labels.

However, in practice, only the route/Prefix in the IGP routing table can enable label binding. Therefore, the BGP-LU mechanism can only provide the same transmission path and resources for different VPN services between two specified Provider Edges (PE), leading to the fact that it is difficult for the current BGP-LU mechanism to support flexible and differentiated transmission paths required by different VPN services when VPN users have differentiated requirements for the transmission quality of services, for example some VPN services require low-latency transmission and some require low-latency and jitter transmission.

SUMMARY

In view of above issues, an embodiment of the present disclosure provides a path construction method, may including: advertising, by a second PE node, a first VPN route to a first PE node through an MP-BGP signaling channel, such that the first PE node is able to determine a label forwarding path to a first VPN Prefix based on a first transmission path descriptor (TPD) carried in the first VPN route received; where the first TPD is configured to identify the label forwarding path for a first VPN message to reach a BGP next hop.

An embodiment of the present disclosure provides a method for constructing a transmission path, may including: receiving, by a first PE node, a first VPN route advertised by a second PE node through an MP-BGP signaling channel; where the first VPN route carries a first transmission path descriptor (TPD) configured to identify a label forwarding path for a first VPN message to reach a BGP next hop; and determining, by the first PE node, the label forwarding path to a first VPN Prefix based on the first TPD carried in the first VPN route received.

An embodiment of the present disclosure provides a method for constructing a transmission path, may including: forwarding, by an Area Border Router (ABR), a first BGP-LU route advertised by a second PE node to a first PE node through an MP-BGP signaling channel, such that the first PE node is able to create a first FTN forwarding entry corresponding to a first FEC based on the first BGP-LU route received, where the first FTN forwarding entry is associated with a label forwarding path identified by a first TPD for a first VPN message to reach a BGP next hop; where the first BGP-LU route carries o the first TPD and a label corresponding to the first FEC, and the first FEC consists of the first TPD and a first prefix configured by the second PE node for the first BGP-LU route.

An embodiment of the present disclosure provides a second PE node, may including: an advertising unit, which is configured to advertise a first VPN route to a first PE node through an MP-BGP signaling channel, such that the first PE node is able to determine a label forwarding path to a first VPN Prefix based on a first transmission path descriptor (TPD) carried in the first VPN route received; where the first TPD is configured to identify the label forwarding path for a first VPN message to reach a BGP next hop.

An embodiment of the present disclosure provides a first PE node, may including: a receiving unit, which is configured to receive a first VPN route advertised by a second PE node through an MP-BGP signaling channel; where the first VPN route carries a first transmission path descriptor (TPD) configured to identify a label forwarding path for a first VPN message to reach a BGP next hop; and a determination unit, which is configured to determine the label forwarding path to a first VPN Prefix based on the first TPD carried in the first VPN route received.

An embodiment of the present disclosure provides an Area Border Router (ABR), may including: a forwarding unit, which is configured to forward a first BGP-LU route advertised by a second PE node to a first PE node through an MP-BGP signaling channel, such that the first PE node is able to create a first FTN forwarding entry corresponding to a first FEC based on the first BGP-LU route received, and the first FTN forwarding entry is associated with a label forwarding path identified by the first TPD for a first VPN message to reach a BGP next hop; where the first BGP-LU route carries the first TPD and a label corresponding to the first FEC, and the first FEC consists of the first TPD and a first prefix configured by the second PE node for the first BGP-LU route.

An embodiment of the present disclosure provides a system for constructing a transmission path, may including: a second PE node, which is configured to advertise a first VPN route to a first PE node through an MP-BGP signaling channel; and a first PE node, which is configured to determine a label forwarding path to a first VPN Prefix based on a first transmission path descriptor (TPD) carried in the first VPN route received; where the first TPD is configured to identify the label forwarding path for a first VPN message to reach a BGP next hop.

An embodiment of the present disclosure provides a second PE node, may including a memory, a processor, and a computer program stored in the memory and executable on the processor, where the computer program, when executed by the processor, causes the processor to perform the method for constructing a transmission path of any one of claims 1 to 10.

An embodiment of the present disclosure provides a first PE node, may including a memory, a processor, and a computer program stored in the memory and executable on the processor, where the computer program, when executed by the processor, causes the processor to perform the method for constructing a transmission path of any one of claims 11 to 17.

An embodiment of the present disclosure provides an Area Border Router (ABR), may including a memory, a processor, and a computer program stored in the memory and executable on the processor, where the computer program, when executed by the processor, causes the processor to perform the method for constructing a transmission path of any one of claims 18 to 19.

An embodiment of the present disclosure provides a computer-readable storage medium storing an information processing program which, when executed by a processor, causes the processor to perform the method for constructing a transmission path of any one of claims 1 to 19.

Other features and advantages of the disclosure will be set forth in the following description and will become apparent in part from the description or be understood by practicing the disclosure. The purposes and other advantages of the present disclosure may be achieved and obtained by the structures indicated in the description, the appended claims and the accompanying drawings.

BRIEF DESCRIPTION OF DRAWINGS

The accompanying drawings are intended to provide a further understanding of the technical schemes of the present disclosure and form part of the description, and together with the embodiments of the present application serve to explain the technical schemes of the present disclosure and do not constitute a limitation on the technical schemes of the present disclosure.

FIG. 4.1 is a schematic diagram of a format of TPD TLV according to example embodiment four of the present disclosure;

FIG. 4.2 is a schematic diagram of a format of Color Sub-TLV according to example embodiment four of the present disclosure;

FIG. 4.3 is a schematic diagram of a format of IGP Prefix Algorithm Sub-TLV according to example embodiment four of the present disclosure;

FIG. 4.4 is a schematic diagram of a format of Network Slice ID Sub-TLV according to example embodiment four of the present disclosure;

FIG. 4.5 is a schematic diagram of a format of Label Sub-TLV according to example embodiment four of the present disclosure;

FIG. 4.6 is a schematic diagram of a format of Label-Index Sub-TLV according to example embodiment four of the present disclosure;

DETAILED DESCRIPTION

In order to make the purposes, technical schemes and advantages of the present disclosure understandable, embodiments of the present disclosure will be described in detail below with reference to the accompanying drawings. It should be noted that the embodiments of the present application and the features in the embodiments may be arbitrarily combined with each other without conflict.

The steps shown in the flowchart of the drawings may be performed in a computer system such as a set of computer-executable instructions. And, although a logical order is shown in the flowchart, in some cases the steps shown or described may be performed in a different order.

The BGP-LU mechanism can only provide the same transmission path and resources for different VPN services between two specified Provider Edges (PE), leading to the fact that it is impossible for the current BGP-LU mechanism to support flexible and differentiated transmission paths required by different VPN services when VPN users have differentiated requirements for the transmission quality of services, for example some VPN services require low-latency transmission and some require low-latency and jitter transmission.

Therefore, embodiments of the present disclosure provide a new transmission path descriptor (TPD). Once advertised, a VPN route carries the TPD corresponding to a VPN service, thus a transmission path meeting the service requirements can be selected for the VPN service. Further, once advertised, a BGP-LU route carries the TPD corresponding to a VPN service, thus flexible and differentiated BGP-LU transmission paths can be provided for the VPN services between two specified PEs.

Example Embodiment One

Figure 1:
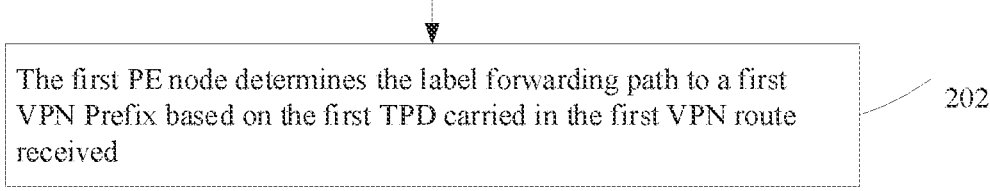
FIG. 1 is a flow chart of a path construction method according to example embodiment one of the present disclosure.

FIG. 1 is a flow chart of a path construction method according to the example embodiment one of the present disclosure. As shown in FIG. 1, the method includes a step S101.

At step S101, a second PE node advertises a first VPN route to a first PE node through an MP-BGP signaling channel, such that the first PE node determines a label forwarding path to a first VPN Prefix based on a first transmission path descriptor (TPD) carried in the first VPN route received.

The first TPD is configured to identify the label forwarding path for a first VPN message to reach a BGP next hop.

Before the second PE node advertises the first VPN route to the first PE node through the MP-BGP signaling channel, the method further includes:
predefining a plurality of TPDs, where each of the plurality of TPDs corresponds to an underlying transmission path that supports a VPN service;
the second PE node creating a first VPN with the first PE node and determining the first TPD based on the underlying transmission path meeting the service requirements of the first VPN;

The underlying transmission path includes one of a tunnel, a network slice, an IGP Prefix Algorithm, a specified tunnel in the network slice, a specified Algorithm in the network slice, and a specified tunnel in the network slice based on the specified Algorithm.

Before the second PE node advertises the first VPN route to the first PE node through the MP-BGP signaling channel, the method further includes: the second PE node advertises a first BGP-LU route to the first PE node by an Area Border Router (ABR) through the MP-BGP signaling channel, such that the first PE node creates a first FTN forwarding entry corresponding to a first FEC based on the first BGP-LU route received, where the first FTN forwarding entry is associated with the label forwarding path identified by the first TPD for the first VPN message to reach the BGP next hop.

The first BGP-LU route carries the first TPD and a label corresponding to the first FEC, and the first FEC consists of the first TPD and a first prefix configured by the second PE node for the first BGP-LU route.

The second PE node advertising a first BGP-LU route to the first PE node by an ABR through the MP-BGP signaling channel includes:
the second PE node distributing a first label to the first FEC and creating a first ILM forwarding entry;
the second PE node sending an advertisement message of the first BGP-LU route to the ABR and modifying the BGP next-hop to an address of the second PE node, where the advertisement message of the first BGP-LU Prefix route carries the first TPD and the first label;
the ABR creating a second FTN forwarding entry corresponding to the first FEC based on the advertisement message of the first BGP-LU route received, where the second FTN forwarding entry is associated with the label forwarding path identified by the first TPD for the first VPN message to reach the BGP next hop;
the ABR redistributing a second label to the first FEC to create a second ILM forwarding entry based on the second label;

the ABR replacing the first label in the advertisement message of the first BGP-LU route with the second label, modifying the BGP next-hop to an address of the ABR and forwarding the address to the first PE node.

The method further includes: the second PE node advertises a second VPN route to the first PE node through the MP-BGP signaling channel, such that the first PE node determines a label forwarding path to a second VPN Prefix based on a second TPD carried in the second VPN route received.

The second TPD is configured to identify the label forwarding path for a second VPN message to reach the BGP next hop.

Before the second PE node advertises the second VPN route to the first PE node through the MP-BGP signaling channel, the method further includes: the second PE node creating a second VPN with the first PE node and determining the second TPD based on the underlying transmission path meeting the service requirements of the second VPN.

Before the second PE node advertises the second VPN route to the first PE node through the MP-BGP signaling channel, the method further includes: the second PE node advertises a second BGP-LU route to the first PE node by the ABR through the MP-BGP signaling channel, such that the first PE node creates a third FTN forwarding entry corresponding to a second FEC based on the second BGP-LU route received, where the third FTN forwarding entry is associated with the label forwarding path identified by the second TPD for the second VPN message to reach the BGP next hop.

The second BGP-LU route carries the second TPD and a label corresponding to the second FEC, and the second FEC consists of the second TPD and a second prefix configured by the second PE node for the second BGP-LU route.

The second PE node advertising a second BGP-LU route to the first PE node by the ABR through the MP-BGP signaling channel includes:
the second PE node distributing a third label to the second FEC to create a third ILM forwarding entry;
the second PE node sending an advertisement message of the second BGP-LU route to the ABR and modifying the BGP next-hop to the address of the second PE node, where the advertisement message of the second BGP-LU Prefix route carries the second TPD and the third label;
the ABR creating a fourth FTN forwarding entry corresponding to the second FEC based on the advertisement message of the second BGP-LU route received, where the fourth FTN forwarding entry is associated with the label forwarding path identified by the second TPD for the second VPN message to reach the BGP next hop;
the ABR redistributing a fourth label to the second FEC to create a fourth ILM forwarding entry based on the fourth label;
the ABR replacing the third label in the advertisement message of the second BGP-LU route with the fourth label, modifying the BGP next-hop to the address of the ABR and forwarding the address to the first PE node.

The format of the TPD is TLV, including TPD Type and Sub-TLV, the TPD Type is configured to identify which Sub-TLVs constitute the TPD, and the Sub-TLV includes one or more Sub-TLVs constituting the TPD.

The TPD Type includes following types:
Type 1, which means that the TPD is constituted of Color Sub-TLVs, and is configured to identify a label forwarding path identified by Color to the BGP next hop;

Type 2, which means that the TPD is constituted of IGP Prefix Algorithm Sub-TLVs, and is configured to identify a label forwarding path based on a specified Algorithm to the BGP next hop;

Type 3, which means that the TPD is constituted of Network Slice ID Sub-TLVs, and is configured to identify a label forwarding path in a network slice to the BGP next hop;

Type 4, which means that the TPD is constituted of Network Slice ID Sub-TLVs and Color Sub-TLVs, and is configured to identify a label forwarding path identified by Color in a specified network slice to the BGP next hop;

Type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop;

Type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

Example Embodiment Two

Figure 2:
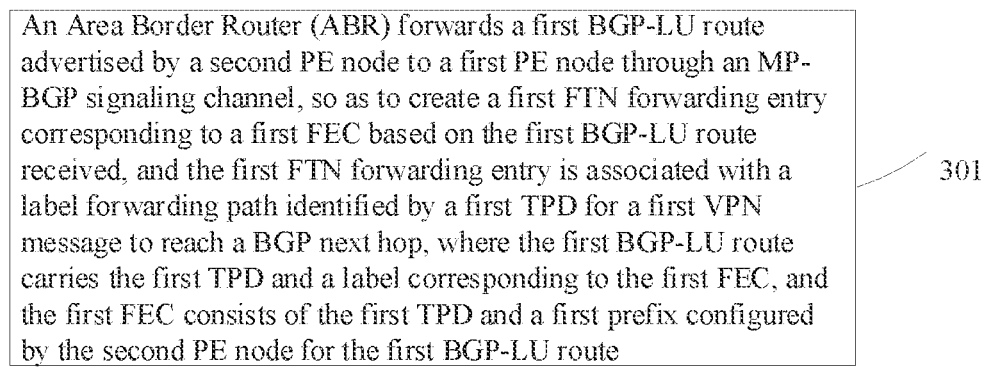
FIG. 2 is a flow chart of a path construction method according to example embodiment three of the present disclosure.

FIG. 2 is a flow chart of a path construction method according to example embodiment two of the present disclosure. As shown in FIG. 2, the method includes a step S201 and a step S202.

At step S201, a first PE node receives a first VPN route advertised by a second PE node through an MP-BGP signaling channel.

The first VPN route carries a first transmission path descriptor (TPD) configured to identify a label forwarding path for a first VPN message to reach a BGP next hop.

At step S202, the first PE node determines the label forwarding path to a first VPN Prefix based on the first TPD carried in the first VPN route received.

Before the first PE node receives the first VPN route advertised by the second PE node through the MP-BGP signaling channel, the method further includes:

the first PE node receiving a first BGP-LU route advertised by the second PE node by an Area Border Router (ABR) through the MP-BGP signaling channel; where the first BGP-LU route carries the first TPD and a label corresponding to the first FEC, and the first FEC consists of the first TPD and a first prefix configured by the second PE node for the first BGP-LU route;

the first PE node creating a first FTN forwarding entry corresponding to the first FEC based on the first BGP-LU route received, where the first FTN forwarding entry is associated with the label forwarding path identified by the first TPD for the first VPN message to reach the BGP next hop.

The first PE node receiving a first BGP-LU route advertised by the second PE node by an Area Border Router (ABR) through the MP-BGP signaling channel includes:

the second PE node distributing a first label to the first FEC and creating a first ILM forwarding entry;

the second PE node sending an advertisement message of the first BGP-LU route to the ABR and modifying the BGP next-hop to an address of the second PE node, where the advertisement message of the first BGP-LU Prefix route carries the first TPD and the first label;

the ABR creating a second FTN forwarding entry corresponding to the first FEC based on the advertisement message of the first BGP-LU route received, where the second FTN forwarding entry is associated with the label forwarding path identified by the first TPD for the first VPN message to reach the BGP next hop;

the ABR redistributing a second label to the first FEC to create a second ILM forwarding entry based on the second label;

the ABR replacing the first label in the advertisement message of the first BGP-LU route with the second label, modifying the BGP next-hop to an address of the ABR and forwarding the address to the first PE node.

The method further includes:

the first PE node receiving a second VPN route advertised by the second PE node through the MP-BGP signaling channel; where the second VPN route carries a second TPD configured to identify the label forwarding path for a second VPN message to reach the BGP next hop;

the first PE node determining the label forwarding path to a second VPN Prefix based on the second TPD carried in the second VPN route received.

Before the first PE node receives the second VPN route advertised by the second PE node through the MP-BGP signaling channel, the method further includes:

the first PE node receiving a second BGP-LU route advertised by the second PE node by the ABR through the MP-BGP signaling channel; where the second BGP-LU route carries the second TPD and a label corresponding to the second FEC, and the second FEC consists of the second TPD and a second prefix configured by the second PE node for the second BGP-LU route;

the first PE node creating a third FTN forwarding entry corresponding to the second FEC based on the second BGP-LU route received, where the third FTN forwarding entry is associated with the label forwarding path identified by the second TPD for the second VPN message to reach the BGP next hop.

The first PE node receiving a second BGP-LU route advertised by the second PE node by the ABR through the MP-BGP signaling channel includes:

the second PE node distributing a third label to the second FEC to create a third ILM forwarding entry;

the second PE node sending an advertisement message of the second BGP-LU route to the ABR and modifying the BGP next-hop to the address of the second PE node, where the advertisement message of the second BGP-LU Prefix route carries the second TPD and the third label;

the ABR creating a fourth FTN forwarding entry corresponding to the second FEC based on the advertisement message of the second BGP-LU route received, where the fourth FTN forwarding entry is associated with the label forwarding path identified by the second TPD for the second VPN message to reach the BGP next hop;

the ABR redistributing a fourth label to the second FEC to create a fourth ILM forwarding entry based on the fourth label;

the ABR replacing the third label in the advertisement message of the second BGP-LU route with the fourth label, modifying the BGP next-hop to the address of the ABR and forwarding the address to the first PE node.

The first PE node determining the label forwarding path to a first VPN Prefix based on the first TPD carried in the first VPN route received includes: the first PE node obtaining the first FEC based on the first TPD, and iterating the label forwarding path to the first VPN Prefix based on the first FEC.

Alternatively, the first PE node determining the label forwarding path to a second VPN Prefix based on the second TPD carried in the second VPN route received includes: the first PE node obtaining a second FEC based on the second TPD, and iterating the label forwarding path to the second VPN Prefix based on the second FEC.

The format of the TPD is TLV, including TPD Type and Sub-TLV, the TPD Type is configured to identify which Sub-TLVs constitute the TPD, and the Sub-TLV includes one or more Sub-TLVs constituting the TPD.

The TPD Type includes following types:
Type 1, which means that the TPD is constituted of Color Sub-TLVs, and is configured to identify a label forwarding path identified by Color to the BGP next hop;
Type 2, which means that the TPD is constituted of IGP Prefix Algorithm Sub-TLVs, and is configured to identify a label forwarding path based on a specified Algorithm to the BGP next hop;
Type 3, which means that the TPD is constituted of Network Slice ID Sub-TLVs, and is configured to identify a label forwarding path in a network slice to the BGP next hop;
Type 4, which means that the TPD is constituted of Network Slice ID Sub-TLVs and Color Sub-TLVs, and is configured to identify a label forwarding path identified by Color in a specified network slice to the BGP next hop;
Type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop;
Type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

Example Embodiment Three

Figure 3:
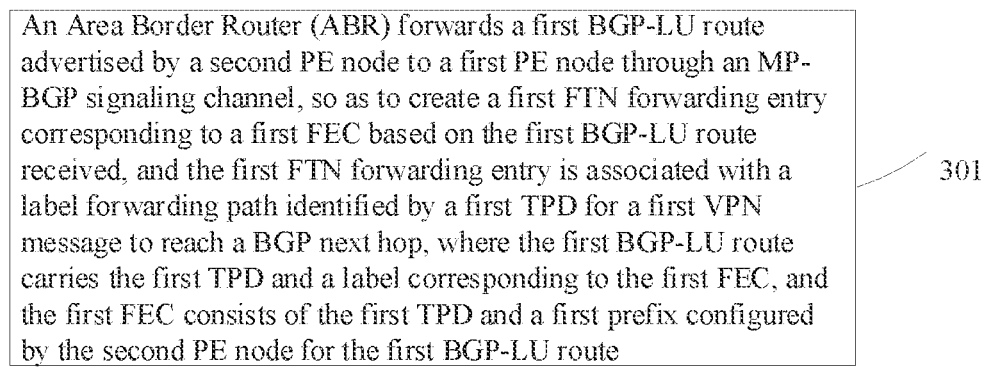
FIG. 3 is a flow chart of the path construction method according to example embodiment three of the present disclosure.

FIG. 3 is a flow chart of the path construction method according to example embodiment three of the present disclosure. As shown in FIG. 3, the method includes a step S301.

At step S301, an Area Border Router (ABR) forwards a first BGP-LU route advertised by a second PE node to a first PE node through an MP-BGP signaling channel, so as to create a first FTN forwarding entry corresponding to a first FEC based on the first BGP-LU route received, where the first FTN forwarding entry is associated with a label forwarding path identified by a first TPD for a first VPN message to reach a BGP next hop.

The first BGP-LU route carries the first TPD and a label corresponding to the first FEC, and the first FEC consists of the first TPD and a first prefix configured by the second PE node for the first BGP-LU route.

The ABR forwarding a first BGP-LU route advertised by the second PE node to the first PE node through the MP-BGP signaling channel includes:
the ABR receiving an advertisement message of the first BGP-LU route from the second PE node, where the advertisement message of the first BGP-LU Prefix route carries the first TPD and a first label distributed by the second PE for the first FEC;
the ABR creating a second FTN forwarding entry corresponding to the first FEC based on the advertisement message of the first BGP-LU route received, where the second FTN forwarding entry is associated with the label forwarding path identified by the first TPD for the first VPN message to reach the BGP next hop;
the ABR redistributing a second label to the first FEC to create a second ILM forwarding entry based on the second label;
the ABR replacing the first label in the advertisement message of the first BGP-LU route with the second label, modifying the BGP next-hop to an address of the ABR and forwarding the address to the first PE node.

The method further includes: the ABR forwarding a second BGP-LU route advertised by the second PE node to the first PE node through the MP-BGP signaling channel, such that the first PE node creates a third FTN forwarding entry corresponding to a second FEC based on the second BGP-LU route received, where the third FTN forwarding entry is associated with a label forwarding path identified by a second TPD for a second VPN message to reach the BGP next hop.

The second BGP-LU route carries the second TPD and a label corresponding to the second FEC, and the second FEC consists of the second TPD and a second prefix configured by the second PE node for the second BGP-LU route.

The ABR forwarding a second BGP-LU route advertised by the second PE node to the first PE node through the MP-BGP signaling channel includes:
the ABR receiving an advertisement message of the second BGP-LU route from the second PE node, where the advertisement message of the second BGP-LU Prefix route carries the second TPD and a third label distributed by the second PE for the second FEC;
the ABR creating a fourth FTN forwarding entry corresponding to the second FEC based on the advertisement message of the second BGP-LU route received, where the fourth FTN forwarding entry is associated with the label forwarding path identified by the second TPD for the second VPN message to reach the BGP next hop;
the ABR redistributing a fourth label to the second FEC to create a fourth ILM forwarding entry based on the fourth label;
the ABR replacing the third label in the advertisement message of the second BGP-LU route with the fourth label, modifying the BGP next-hop to the address of the ABR and forwarding the address to the first PE node.

The format of the TPD is TLV, including TPD Type and Sub-TLV, the TPD Type is configured to identify which Sub-TLVs constitute the TPD, and the Sub-TLV includes one or more Sub-TLVs constituting the TPD.

The TPD Type includes following types:
Type 1, which means that the TPD is constituted of Color Sub-TLVs, and is configured to identify a label forwarding path identified by Color to the BGP next hop;
Type 2, which means that the TPD is constituted of IGP Prefix Algorithm Sub-TLVs, and is configured to identify a label forwarding path based on a specified Algorithm to the BGP next hop;
Type 3, which means that the TPD is constituted of Network Slice ID Sub-TLVs, and is configured to identify a label forwarding path in a network slice to the BGP next hop;
Type 4, which means that the TPD is constituted of Network Slice ID Sub-TLVs and Color Sub-TLVs, and is configured to identify a label forwarding path identified by Color in a specified network slice to the BGP next hop;

Type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop;

Type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

The technical schemes provided in embodiments one, two and three are described in detail by several specific embodiments below.

Example Embodiment Four

Embodiments of the present disclosure introduce a new Transmission Path descriptor (TPD).

When creating VPNs, corresponding topology-related resources (e.g., which nodes and links are included) and resources in nodes (e.g., how many queues and processor resources are included) are distributed to each VPN in the network, and then underlying transmission paths meeting VPN requirements are established through MPLS technologies such as IGP (Interior Gateway Protocol), LDP (label Distribution Protocol) and SR (Segment routing).

In a BGP/MPLS VPN system, a plurality of transmission path descriptors (TPD) may be predefined, where each of the plurality of TPDs corresponds to an underlying transmission path supporting a VPN service.

The TPDs may be defined according to the transmission requirements of the VPN services. An underlying transmission path identified by a TPD may be a tunnel, a Network Slice, an IGP Prefix Algorithm (including the Flexible Algorithm defined in draft-ietf-lsr-flex-algo), a TE (traffic engineering) label forwarding path, or a combination thereof.

The TPD may be carried in an advertisement message of a VPN route or a BGP-LU route. In the embodiments of the present disclosure, the advertisement message of the VPN route or the BGP-LU route may be carried in BGP messages such as an MP-IBGP Update message, for example, the TPD may be added to an attribute extension field of the MP-BGP Update message.

In order to carry the TPD and the label of the FEC corresponding to the TPD in the BGP message, a specific implementation way is to extend a path attribute of a BGP route and add an optional and transitive BGP path attribute which is called TPD attribute. The TPD attribute carries a set of TLVs.

The format of TPD TLV are shown in FIG. 4-1, including:
TLV Type: To be distributed;
Length: The number of bytes occupied by the TLV;
TPD Type: It is configured to indicate which Sub-TLVs constitute the TPD;
Flags: R Bit means it is required to remove the TLV, or otherwise add or update the TLV.

The TPD attribute carried in the advertisement message of the VPN route (SAFI=128) is only required to carry the Sub-TLVs that identify the TPD. The TPD attribute carried in the advertisement message of the BGP-LU Prefix route (SAFI=4) is only required to carry Sub-TLVs that identify the TPD and the label.

The TPD TLV may carry a variety of Sub-TLVs. One implementation way is to define three Sub-TLVs that identify the TPD and two Sub-TLVs that identify the label.

The three Sub-TLVs that identify the TPD are as follows:
Color Sub-TLV, with a format shown in FIG. 4-2;
IGP Prefix Algorithm Sub-TLV, with a format shown in FIG. 4-3; and
Network Slice ID Sub-TLV, with a format shown in FIG. 4-4.

The following TPD types in the TLV are configured to identify which Sub-TLVs constitute the TPD:

Type 1, which means that the TPD is constituted of Color Sub-TLVs, and is configured to identify a label forwarding path identified by Color to the BGP next hop;

Type 2, which means that the TPD is constituted of IGP Prefix Algorithm Sub-TLVs, and is configured to identify a label forwarding path based on a specified Algorithm to the BGP next hop;

Type 3, which means that the TPD is constituted of Network Slice ID Sub-TLVs, and is configured to identify a label forwarding path in a network slice to the BGP next hop;

Type 4, which means that the TPD is constituted of Network Slice ID Sub-TLVs and Color Sub-TLVs, and is configured to identify a label forwarding path identified by Color in a specified network slice to the BGP next hop;

Type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop;

Type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

Two Sub-TLVs that identify the label are Label Sub-TLV and Label-Index Sub-TLV.

Figure 5:
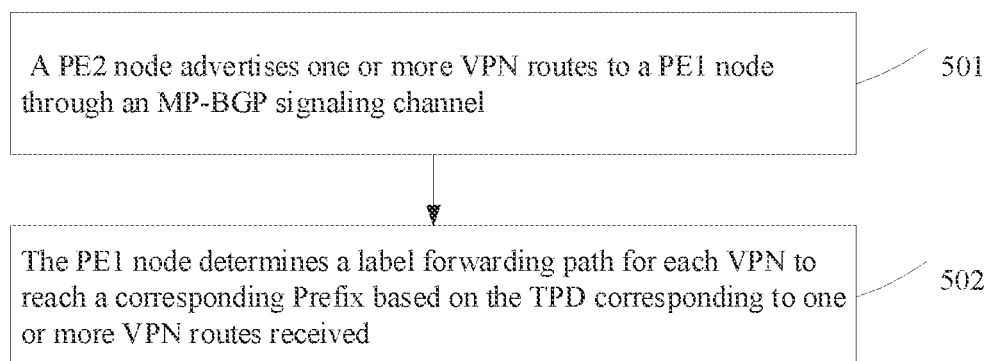
FIG. 5 is a flow chart of a path construction method according to example embodiment five of the present disclosure.

The Label Sub-TLV with a format shown in FIG. 4-5 carries the label distributed by a BGP peer to the Forwarding Equivalent Class (FEC) corresponding to the TPD.

Figure 6:
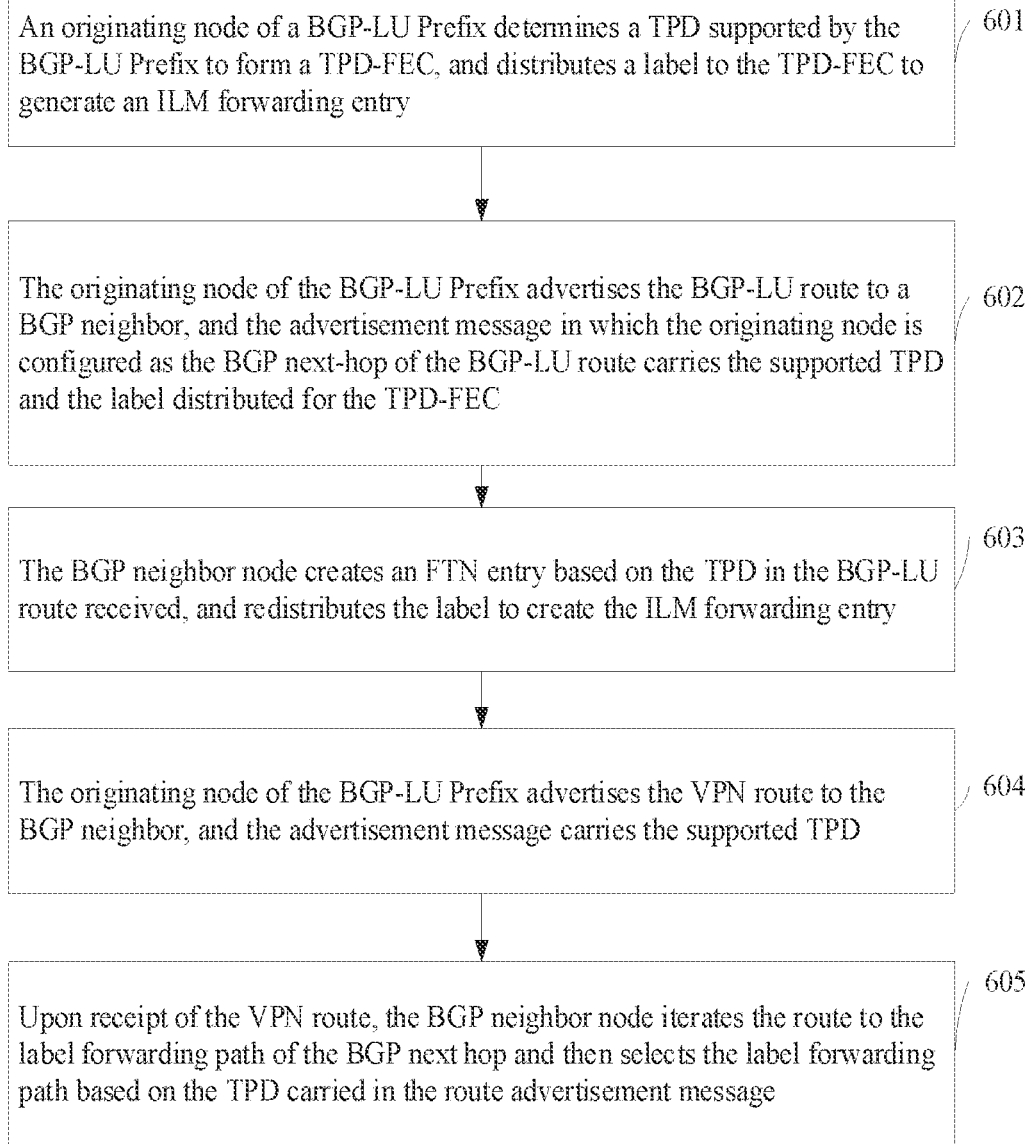
FIG. 6 is a flow chart of a path construction method according to example embodiment six of the present disclosure.

The Label-Index Sub-TLV with a format shown in FIG. 4-6 carries BGP Prefix-SID (Segment ID) corresponding to the TPD.

Example Embodiment Five

FIG. 5 is a flow chart of a path construction method according to example embodiment five of the present disclosure. As shown in FIG. 5, the method includes a step 501 and a step 502.

At step S501, a PE2 node advertises one or more VPN routes to a PE1 node through an MP-BGP signaling channel.

The VPN route may be advertised by sending a BGP message that may carry one or more VPN routes, and each VPN route carries a corresponding TPD.

At step S502, a PE1 node determines a label forwarding path for each VPN to reach a corresponding Prefix based on a corresponding TPD in the one or more VPN routes received.

In an MPLS network, the PE1 node and the PE2 node enable an IGP network, and a first VPN may be created on the PE1 node and the PE2 node according to the user's need to establish an underlying transmission path meeting the requirements of the first VPN. For example, a Red tunnel may be established in the IGP network to meet the transmission requirements of the first VPN. After the VPN is created and the tunnel meeting the VPN service requirements is established, the PE2 node may configure a first TPD for the first VPN. For example, it can be determined based on the TPDs predefined in example embodiment four that the TPD type of the first TPD corresponding to the first VPN is 1, which means that the first TPD is constituted of Color (Red) Sub-TLVs, and is configured to identify a label forwarding path identified by Color (Red) to the BGP next hop.

The MP-BGP signaling channel is established between the PE1 node and the PE2 node, and VPN routes may be advertised through MP-BGP messages.

When creating a VPN on the PE1 node and the PE2 node, the PE2 node sends a BGP message to the PE1 node through the MP-BGP signaling channel, and the BGP message carries a first VPN route carrying the first TPD.

At the same time, a second VPN may also be created on the PE1 node and the PE2 node according to the user's needs to establish an underlying transmission path meeting the requirements of the second VPN. For example, a Blue tunnel may be established in the IGP network to meet the transmission requirements of the second VPN. In this way, it can be determined based on the TPDs predefined in example embodiment four that the TPD type of the second TPD corresponding to the second VPN is 1, which means that the second TPD is constituted of Color (Blue) Sub-TLVs, and is configured to identify a label forwarding path identified by Color (Blue) to the BGP next hop.

If there are two VPNs on the PE1 node and the PE2 node, the second VPN route may be advertised by another BGP message, or may be advertised simultaneously with the first VPN route carried in the same BGP message. That is, when creating two VPNs on the PE1 node and the PE2 node, the PE2 node sends a BGP message to the PE1 node through the MP-BGP signaling channel, and the BGP message carries the first VPN route and the second VPN route. The first TPD is carried in the first VPN route while the second TPD is carried in the second VPN route. By analogy, if there are a plurality of VPNs on the PE1 node and the PE2 node at the same time, a plurality of VPN routes can be advertised separately or simultaneously by being carried in one BGP message, and each VPN route carries its corresponding TPD when advertised.

The underlying transmission path meeting the VPN requirements may also be a network slice, a specified Algorithm, a tunnel in the network slice, a specified Algorithm in the network slice, a tunnel with the specified Algorithm in the network slice, etc. In this way, transmission paths meeting specific requirements can be selected for different VPN services.

How to establish the MP-BGP signaling channels, how to create the VPNs, and the formats of BGP messages for advertising the VPN route belong to the existing technologies, which will not be repeated herein.

Example Embodiment Six

FIG. 6 is a flow chart of a path construction method according to example embodiment six of the present disclosure. As shown in FIG. 6, the method includes following steps S601 to S605.

At step S601, an originating node of a BGP-LU Prefix determines a TPD supported by the BGP-LU Prefix to form a TPD-FEC, and distributes a label to the TPD-FEC to generate an ILM forwarding entry.

Before the step S601, the originating node and a neighbor node enable an IGP network in an MPLS network, a VPN is created on the originating node and the neighbor node to establish an underlying transmission path meeting the VPN requirements in the IGP network, and an MP-BGP signaling channel, which may be configured to advertise a BGP-LU route and a VPN route, is established.

Generally, the TPD supported by the BGP-LU Prefix (usually loopback route) is configured on the originating node of the BGP-LU Prefix, and a combination of Prefix and TPD is regarded as a Forwarding Equivalence Class (FEC), which is called TPD-FEC. In addition, a corresponding Prefix-SID needs to be configured for the TPD-FEC in case of BGP-SR.

A label can be distributed to the TPD-FEC to generate an Incoming Label Map (ILM) forwarding entry without enabling Penultimate Hop Popping (PHP).

Before the step S601, TPDs may be predefined for VPN services, as detailed in example embodiment four.

At step S602, the originating node of the BGP-LU Prefix advertises the BGP-LU route to a BGP neighbor, and the advertisement message in which the originating node is configured as the BGP next-hop of the BGP-LU route carries the supported TPD and the label distributed for the TPD-FEC.

In this embodiment, a Subsequent Address Family Identifier (SAFI) of the BGP-LU route is 4.

In addition, in the case of SR, the advertisement message also carries a corresponding Prefix SID.

At step S603, the BGP neighbor node creates an FTN entry based on the TPD in the BGP-LU route received, and redistributes the label to create the ILM forwarding entry.

Upon receipt of the corresponding advertisement message of the BGP-LU route, the BGP neighbor node may create an FEC to NHLFE Map (FTN) forwarding entry for the TPD-FEC, redistribute a new label for the TPD-FEC, and create the ILM forwarding entry based on the redistributed new label.

The forwarding message contained in the FTN and ILM forwarding entries iterates the BGP next-hop using intra-node resources corresponding to the TPD and according to the route to the underlying transmission path meeting the TPD requirements.

In addition, the BGP neighbor node may continue to advertise the BGP-LU route to other BGP neighbors, and modify itself as the BGP next-hop of the BGP-LU route and the TPD-FEC label as a label redistributed therefor during advertising. Other BGP neighbors are processed in a similar manner to the BGP neighbor above.

At step S604, the originating node of the BGP-LU Prefix advertises the VPN route to the BGP neighbor, and the advertisement message carries the supported TPD.

For example, when advertising a BGP VPN (SAFI=128) route, the message carries the TPD required by the VPN service.

At step S605, upon receipt of the VPN route, when iterating the label forwarding path to the BGP next hop, the BGP neighbor node selects the label forwarding path based on the TPD carried in the route advertisement message.

For example, upon receipt of the advertisement message of the VPN route (SAFI=128), when iterating the label forwarding path to the BGP next hop, the label forwarding path is selected based on the TPD carried in the route advertisement message.

With the technical scheme provided in example embodiment six of the present disclosure, differentiated transmission paths in accurate end-to-end connection with respective VPN routes can be provided for the VPN services.

Example Embodiment Seven

Figure 7:
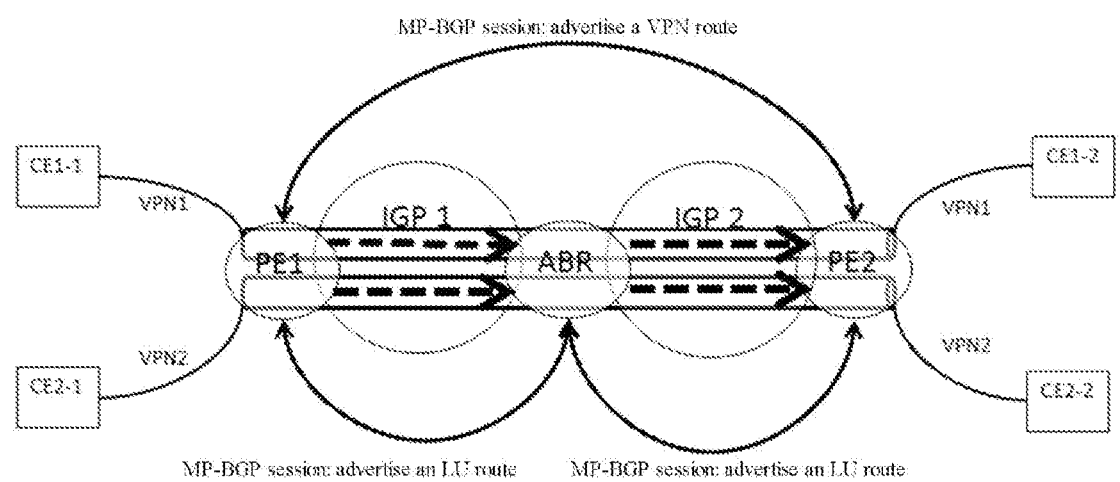
FIG. 7 is a structure diagram of a path construction system according to example embodiment seven of the present disclosure.
Figure 8:
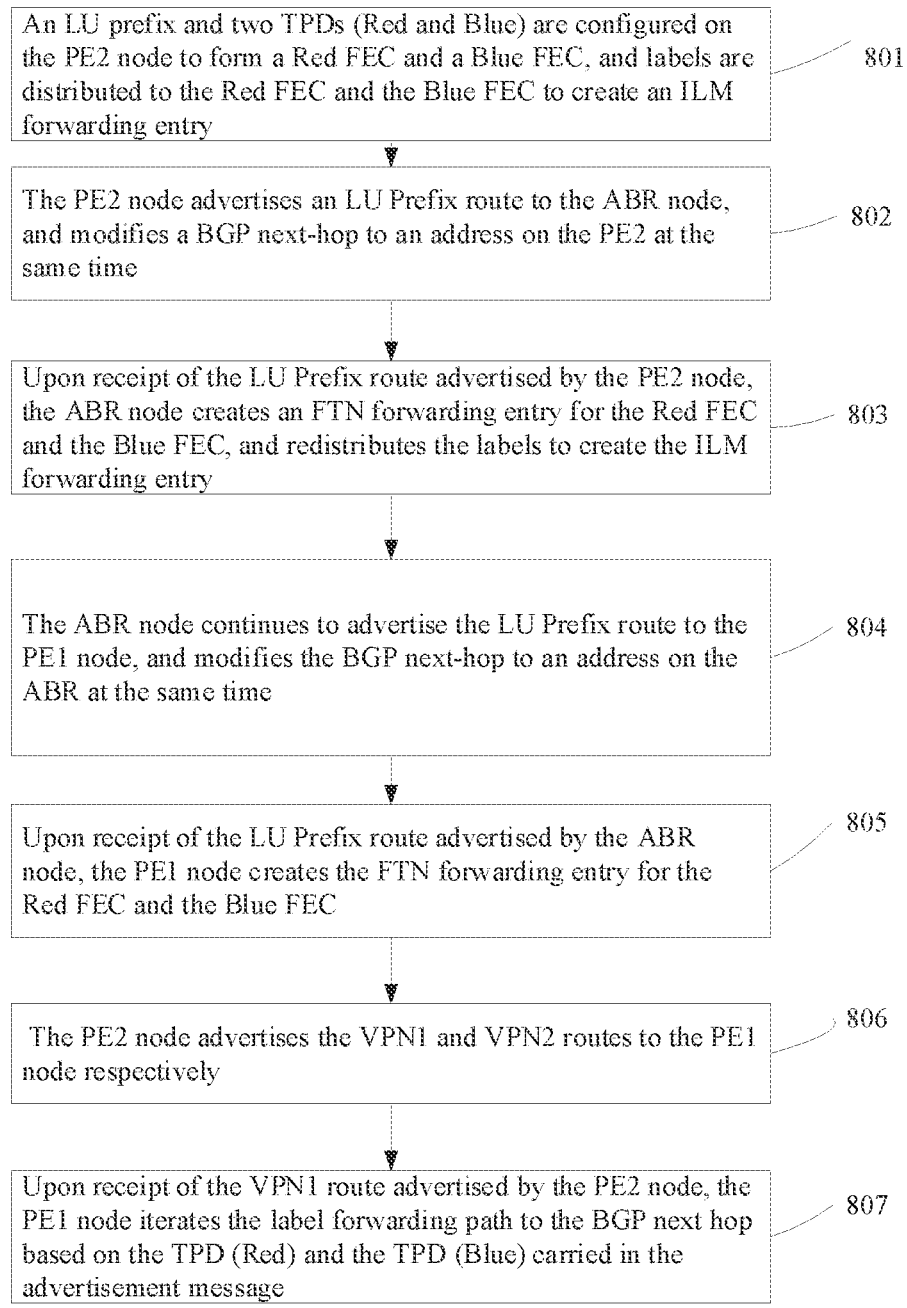
FIG. 8 is a flow chart of a path construction method according to example embodiment seven of the present disclosure.

FIG. 7 is a structure diagram of a path construction system according to example embodiment seven of the present disclosure, and FIG. 8 is a flow chart of a path construction method according to example embodiment seven of the present disclosure.

Example embodiment seven describes the construction of an end-to-end transmission path on a BGP-LU path by selecting a label forwarding path identified by a Color. In an MPLS network shown in FIG. 7, a Customer Edge Router (CE) 1-1 and a CE 1-2 are sites of a VPN1, and a CE2-1 and a CE 2-2 are sites of a VPN2. An IGP-enabled network exists between an ABR node and a PE1 node, and between the ABR node and a PE2 node, an MP-BGP session (i.e., an MP-BGP signaling channel) is established between the PE1 node and the ABR node and between the ABR node and the PE2 node for advertising a BGP-LU route, while an MP-BGP session is established between the PE1 node and the PE2 node for advertising a VPN route. As shown in FIG. 8, when creating the VPN1 and the VPN2 on the PE1 node and the PE2 node according to the user's needs, the method for constructing a path for the PE1 node to send traffic flows to the PE2 node according to example embodiment seven of the present disclosure includes following steps S801 to S807.

At step S801, an LU prefix and two TPDs (Red and Blue) are configured on the PE2 node to form a Red FEC and a Blue FEC, and a label is distributed to the Red FEC and the Blue FEC to create an ILM forwarding entry.

Before the step S801, a tunnel meeting the requirements of the VPN1 and the VPN2 is established in an IGP1 network and an IGP2 network, respectively, and different tunnels are distinguished by Colors. For example, in example embodiment seven, the Red tunnel (the Red tunnel shown by the upper dashed line in FIG. 7) is configured to meet the requirements of the VPN1 and the Blue tunnel (the Blue tunnel shown by the lower dashed line in FIG. 7) is configured to meet the requirements of the VPN2.

In addition, a Red Prefix SID and a Blue Prefix SID need to be distributed in case of SR, and a label is distributed for the Red FEC and the Blue FEC to create the ILM forwarding entry in case that Penultimate Hop Popping (PHP) is not enabled.

At step S802, the PE2 node advertises an LU Prefix route to the ABR node, and modifies a BGP next-hop to an address on the PE2 at the same time.

An advertisement message of the LU Prefix route carries the Red TPD, the Blue TPD, and the label distributed for the Red FEC and the Blue FEC.

The advertisement message of the LU Prefix route carries a TPD attribute that carries two TLVs. One TLV carries a Color Sub-TLV (the Color is Red) and a Label Sub-TLV (a label corresponding to the Red FEC), and in case of SR, the advertisement message also carries a Label-Index Sub-TLV (Red Prefix SID). The other TLV carries a Color Sub-TLV (the Color is Blue) and a Label Sub-TLV (a label corresponding to the Blue FEC).

The PE2 node may also advertise the LU Prefix route of the VPN1 and the LU Prefix route of the VPN2 to the ABR node, respectively.

In case of SR, the advertisement message of the LU Prefix route also carries a Label-Index Sub-TLV (Blue Prefix SID).

The message of the LU Prefix route may be carried in an MP-BGP Update message, and specifically may carry the TPD attribute by extending a NLRI field.

At step S803, upon receipt of the LU Prefix route advertised by the PE2 node, the ABR node creates an FTN forwarding entry for the Red FEC and the Blue FEC, and redistributes a label to create the ILM forwarding entry.

The FTN forwarding entry and ILM forwarding entry are associated with a TE label forwarding path identified by Color to the BGP next hop in the IGP2.

At step S804, the ABR node continues to advertise the LU Prefix route to the PE1 node, and modifies the BGP next-hop to an address on the ABR at the same time.

The ABR node replaces the Red FEC and Blue FEC labels in the TLVs carried in the route message with the Red FEC and Blue FEC labels redistributed by the ABR node and forwards the labels to the PE1 node.

At step S805, upon receipt of the LU Prefix route advertised by the ABR node, the PE1 node creates the FTN forwarding entry for the Red FEC and the Blue FEC.

The FTN forwarding entry is associated with the TE label forwarding path identified by Color to the BGP next hop in the IGP1.

At step S806, the PE2 node advertises the VPN1 and VPN2 routes to the PE1 node, respectively.

The advertisement message of the VPN route carries the Red TPD and the Blue TPD.

The message advertising the VPN1 route carries the TPD attribute that carries one TLV carrying the Color Sub-TLV (the Color is Red), and the message advertising the VPN2 route carries the TPD attribute that carries one TLV carrying the Color Sub-TLV (the Color is Blue). The VPN1 route and the VPN2 route may also be carried in one advertisement message for transmission.

The advertisement message of the VPN route may be carried in the MP-BGP Update message, and specifically may carry the TPD attribute by extending the NLRI field.

At step S807, upon receipt of the VPN1 route advertised by the PE2 node, the PE1 node iterates the label forwarding path to the BGP next hop based on the TPD (Red) and the TPD (Blue) carried in the advertisement message.

Specifically, the Red FEC is formed by the TPD (Red) and the BGP next hop carried in the message, and the label forwarding path to the VPN1 Prefix is iterated by the Red FEC. The Blue FEC is formed by the TPD (Blue) and the BGP next hop carried in the message, and the label forwarding path to the VPN2 Prefix is iterated by the Blue FEC.

How to create the FTN forwarding entry and the ILM forwarding entry and how to distribute the labels belong to the existing technologies, which will not be repeated herein.

Example embodiment seven of the present disclosure provides technical schemes to construct end-to-end transmission paths meeting the requirements of the VPN1 and VPN2 for the VPN1 and VPN2, respectively.

Example Embodiment Eight

Figure 9:
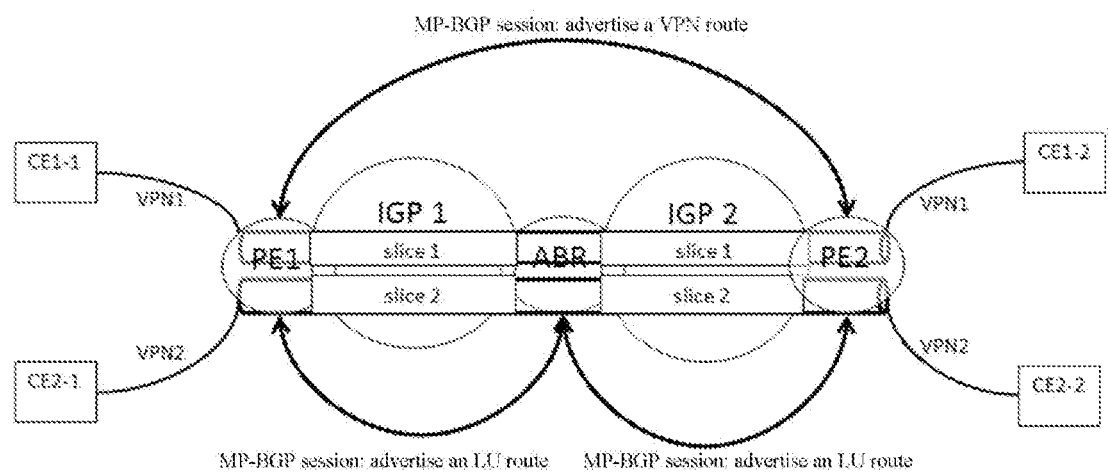
FIG. 9 is a structure diagram of a path construction system according to example embodiment eight of the present disclosure.
Figure 10:
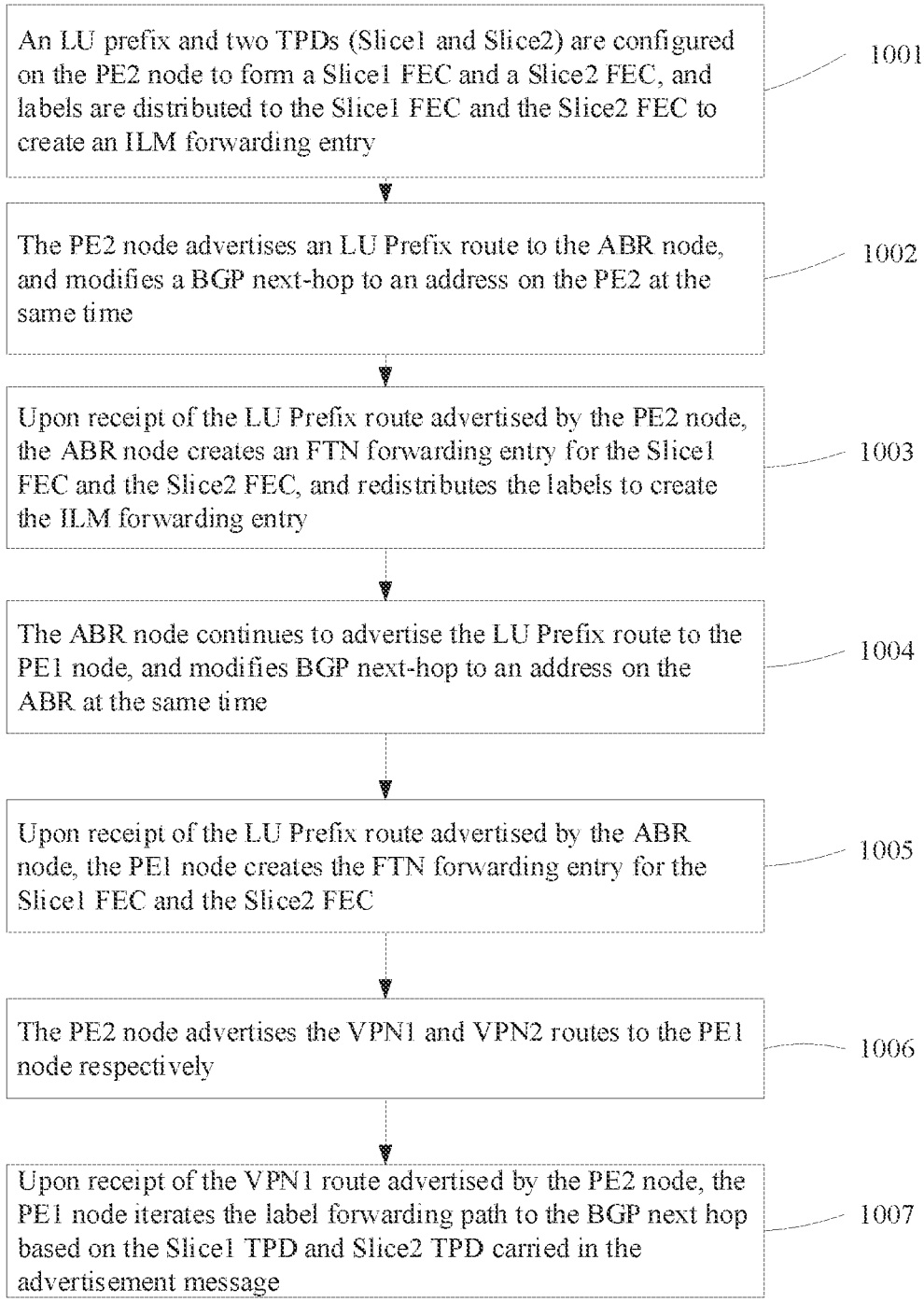
FIG. 10 is a flow chart of a path construction method according to example embodiment eight of the present disclosure.

FIG. 9 is a structure diagram of a path construction system according to example embodiment eight of the present disclosure, and FIG. 10 is a flow chart of a path construction method according to example embodiment eight of the present disclosure.

Example embodiment eight describes the construction of an end-to-end transmission path on a BGP-LU path by selecting a Network Slice. In an MPLS network shown in FIG. 9, a Customer Edge Router (CE) 1-1 and a CE 1-2 are sites of a VPN1, and a CE2-1 and a CE 2-2 are sites of a VPN2. An IGP-enabled network exists between an ABR node and a PE1 node, and between the ABR node and a PE2 node, an MP-BGP session is established between the PE1 node and the ABR node and between the ABR node and the PE2 node for advertising an LU route, while an MP-BGP session is established between the PE1 node and the PE2 node for advertising a VPN route. As shown in FIG. 10, when creating the VPN1 and the VPN2 on the PE1 node and the PE2 node according to the user's needs, the method for constructing a path for the PE1 node to send traffic flows to the PE2 according to example embodiment eight of the present disclosure includes following steps S1001 to S1007.

At step S1001, an LU prefix and two TPDs (Slice1 and Slice2) are configured on the PE2 node to form a Slice1 FEC and a Slice2 FEC, and a label is distributed to the Slice1 FEC and the Slice2 FEC to create an ILM forwarding entry.

Before the step S1001, a Network Slice meeting the requirements of the VPN1 and the VPN2 is established in an IGP1 network and an IGP2 network, respectively. For example, in example embodiment eight, the Slice1 is configured to meet the requirements of the VPN1 while the Slice2 is configured to meet the requirements of the VPN2.

In case of SR, a Slice1 Prefix SID and a Slice2 Prefix SID need to be distributed to the Slice1 FEC and the Slice2 FEC, respectively.

The label may be distributed to the Slice1 FEC and the Slice2 FEC, respectively to create the ILM forwarding entry without enabling Penultimate Hop Popping (PHP).

At step S1002, the PE2 node advertises an LU Prefix route to the ABR node, and modifies a BGP next-hop to an address on the PE2 at the same time.

An advertisement message of the LU Prefix route carries the Slice1 TPD, the Slice2 TPD, and the labels distributed for the Slice1 FEC and the Slice2 FEC.

Specifically, the advertisement message of the LU Prefix route carries a TPD attribute that carries two TLVs. One TLV carries a Network Slice ID Sub-TLV (Slice ID is 1) and a Label Sub-TLV (a label corresponding to the Slice1 FEC). The other TLV carries a Network Slice ID Sub-TLV (Slice ID is 2) and a Label Sub-TLV (a label corresponding to the Slice2 FEC).

The PE2 node may also advertise the LU Prefix route of the VPN1 and the LU Prefix route of the VPN2 to the ABR node, respectively.

In case of SR, the advertisement message of the LU Prefix route also carries a Label-Index Sub-TLV (Slice2 Prefix SID) and a Label-Index Sub-TLV (Slice1 Prefix SID).

The message of the LU Prefix route may be carried in an MP-BGP Update message, and specifically may carry the TPD attribute by extending a NLRI field.

At step S1003, upon receipt of the LU Prefix route advertised by the PE2 node, the ABR node creates an FTN forwarding entry for the Slice1 FEC and the Slice2 FEC, and redistributes the labels to create the ILM forwarding entry.

The FTN forwarding entry and the ILM forwarding entry are associated with the label forwarding path identified by the Slice ID in the Slice to the BGP next hop.

At step S1004, the ABR node continues to advertise the LU Prefix route to the PE1 node, and modifies the BGP next-hop to an address on the ABR at the same time.

The ABR node replaces the Slice1 FEC and Slice2 FEC labels in the TPD TLV carried in the route message with the Slice1 FEC and Slice2 FEC labels distributed by the ABR node and forwards the labels to the PE1 node.

At step S1005, upon receipt of the LU Prefix route advertised by the ABR node, the PE1 node creates the FTN forwarding entry for the Slice1 FEC and the Slice2 FEC.

The FTN forwarding entry is associated with the label forwarding path identified by the Slice ID in the Slice to the BGP next hop.

At step S1006, the PE2 node advertises the VPN1 and VPN2 routes to the PE1 node, respectively.

The advertisement message of the VPN route carries the Slice1 TPD and the Slice2 TPD.

Specifically, the message advertising the VPN1 route carries the TPD attribute that carries one TPD TLV carrying the Network Slice ID Sub-TLV (Slice ID is 1). The message advertising the VPN2 route carries the TPD attribute that carries one TPD TLV carrying the Network Slice ID Sub-TLV (Slice ID is 2). The VPN1 route and the VPN2 route may also be carried in one advertisement message for transmission.

The advertisement message of the VPN route may be carried in the MP-BGP Update message, and specifically may carry the TPD attribute by extending the NLRI field.

At step S1007, upon receipt of the VPN1 route advertised by the PE2 node, the PE1 node iterates the label forwarding path to the BGP next hop based on the Slice1 TPD and the Slice2 TPD carried in the advertisement message.

Specifically, the Slice1 FEC may be formed by the TPD (Slice1) and the BGP next hop carried in the message, and the label forwarding path to the VPN1 Prefix may be found by the Slice1 FEC. The Slice2 FEC is formed by the TPD (Slice2) and the BGP next hop carried in the message, and a label forwarding path to the VPN2 Prefix is found by the Slice2 FEC.

Example embodiment eight of the present disclosure provides technical schemes to construct end-to-end transmission paths meeting the requirements of the VPN1 and VPN2 for the VPN1 and VPN2, respectively.

Example Embodiment Nine

Figure 11:
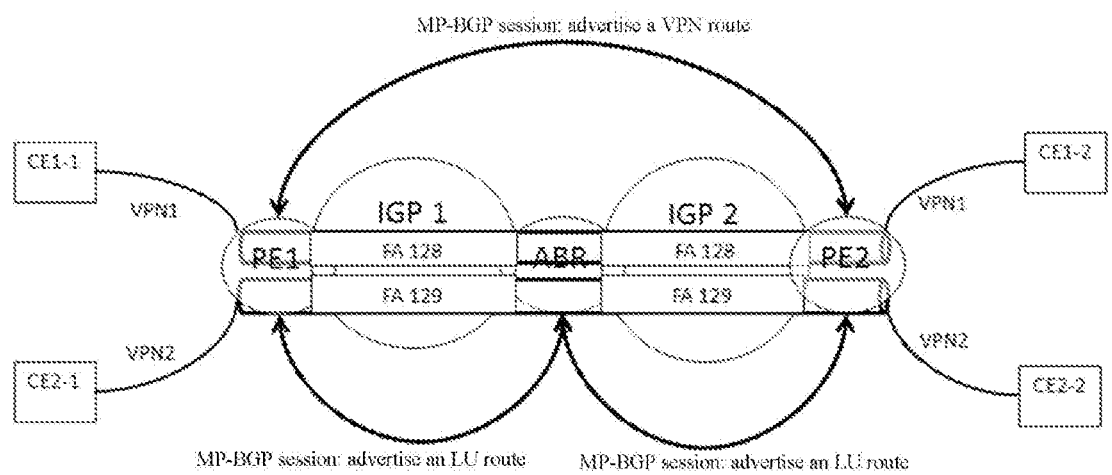
FIG. 11 is a structure diagram of a path construction system according to example embodiment nine of the present disclosure.
Figure 12:
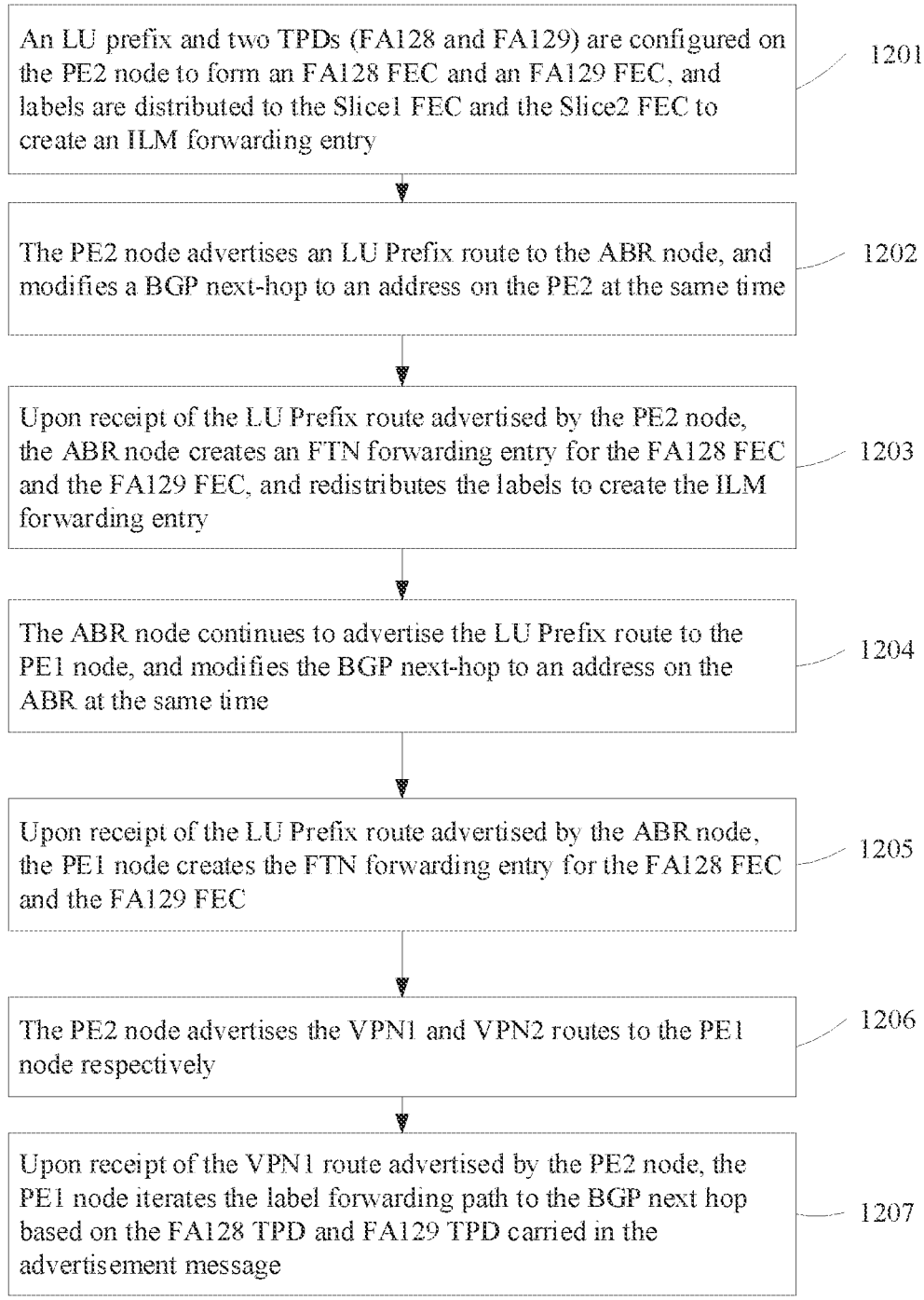
FIG. 12 is a flow chart of a path construction method according to example embodiment nine of the present disclosure.

FIG. 11 is a structure diagram of a path construction system according to example embodiment nine of the present disclosure, and FIG. 12 is a flow chart of a path construction method according to example embodiment nine of the present disclosure.

Example embodiment nine describes the construction of an end-to-end transmission path on a BGP-LU path by selecting an FA (Flexible Algorithm). In an MPLS network shown in FIG. 11, a Customer Edge Router (CE) 1-1 and a CE 1-2 are sites of a VPN1, and a CE2-1 and a CE 2-2 are sites of a VPN2. An IGP-enabled network exists between an ABR node and a PE1 node, and between the ABR node and a PE2 node, an MP-BGP session is established between the PE1 node and the ABR node and between the ABR node and the PE2 node for advertising an LU route, while an MP-BGP session is established between the PE1 node and the PE2 node for advertising a VPN route. As shown in FIG. 12, when creating the VPN1 and the VPN2 on the PE1 node and the PE2 node according to the user's needs, the method for constructing a path for the PE1 node to send traffic flows to the PE2 according to example embodiment nine of the present disclosure includes following steps S1201 to S1207.

At step S1201, an LU prefix and two TPDs (FA128 and FA129) are configured on the PE2 node to form an FA128 FEC and an FA129 FEC, and a label is distributed to the FA128 FEC and the FA129 FEC to create an ILM forwarding entry.

Before the step S1201, the FA meeting the requirements of the VPN1 and the VPN2 is established in an IGP1 network and an IGP2 network, respectively. In example embodiment nine, for example, the FA128 is configured to meet the requirements of the VPN1, and the FA129 is configured to meet the requirements of the VPN2.

In case of SR, an FA1 Prefix SID and an FA2 Prefix SID are also distributed to the PE2 node.

The labels are distributed to the FA128 FEC and the FA129 FEC, respectively to create the ILM forwarding entry without enabling Penultimate Hop Popping (PHP).

At step S1202, the PE2 node advertises an LU Prefix route to the ABR node, and modifies a BGP next-hop to an address on the PE2 at the same time.

An advertisement message of the LU Prefix route carries the FA128 TPD, the FA129 TPD, and the labels distributed for the FA128 FEC and the FA129 FEC.

Specifically, the advertisement message of the LU Prefix route carries a TPD attribute that carries two TLVs. One TLV carries an IGP Prefix Algorithm Sub-TLV (the FA is 128) and a Label Sub-TLV (a label corresponding to the FA128 FEC). The other TLV carries an IGP Prefix Algorithm Sub-TLV (the FA is 129) and a Label Sub-TLV (a label corresponding to the Slice2 FEC).

The PE2 node may also advertise the LU Prefix route of the VPN1 and the LU Prefix route of the VPN2 to the ABR node, respectively.

In case of SR, the advertisement message of the LU Prefix route also carries a Label-Index Sub-TLV (FA129 Prefix SID) and a Label-Index Sub-TLV (FA128 Prefix SID).

The message of the LU Prefix route may be carried in an MP-BGP Update message, and specifically may carry the TPD attribute by extending a NLRI field.

At step S1203, upon receipt of the LU Prefix route advertised by the PE2 node, the ABR node creates an FTN forwarding entry for the FA128 FEC and the FA129 FEC, and redistributes the labels to create the ILM forwarding entry.

The FTN forwarding entry and the ILM forwarding entry are associated with the label forwarding path identified by the FA to the BGP next hop.

At step S1204, the ABR node continues to advertise the LU Prefix route to the PE1 node, and modifies the BGP next-hop to an address on the ABR at the same time.

The ABR node replaces the FA128 FEC and FA129 FEC labels in the TPD TLV carried in the route message with the labels redistributed by the ABR node for the FA128 FEC and the FA129 FEC.

At step S1205, upon receipt of the LU Prefix route advertised by the ABR node, the PE1 node creates the FTN forwarding entry for the FA128 FEC and the FA129 FEC.

The FTN forwarding entry is associated with the label forwarding path identified by FA to the BGP next hop.

At step S1206, the PE2 node advertises the VPN1 and VPN2 routes to the PE1 node, respectively. The advertisement message of the VPN route carries the FA128 TPD and the FA129 TPD.

Specifically, the message advertising the VPN1 route carries the TPD attribute that carries one TPD TLV carrying the IGP Prefix Algorithm Sub-TLV (the FA is 128), and the message advertising the VPN2 route carries the TPD attribute that carries one TPD TLV carrying the IGP Prefix Algorithm Sub-TLV (the FA is 129). The VPN1 route and the VPN2 route may also be carried in one advertisement message for transmission.

The advertisement message of the VPN route may be carried in the MP-BGP Update message, and specifically may carry the TPD attribute by extending the NLRI field.

At step S1207, upon receipt of the VPN1 route advertised by the PE2 node, the PE1 node iterates the label forwarding path to the BGP next hop based on the FA128 TPD and the FA129 TPD carried in the advertisement message.

Specifically, the FA128 FEC may be formed by the TPD (FA128) and the BGP next hop carried in the message, and the label forwarding path to the VPN1 Prefix is found by the FA128 FEC. The FA129 FEC is formed by the TPD (FA129) and the BGP next hop carried in the message, and the label forwarding path to the VPN2 Prefix is found by the FA129 FEC.

Example embodiment nine of the present disclosure provides technical schemes to construct end-to-end transmission paths meeting the requirements of the VPN1 and VPN2 for the VPN1 and VPN2, respectively.

Example Embodiment Ten

Figure 13:
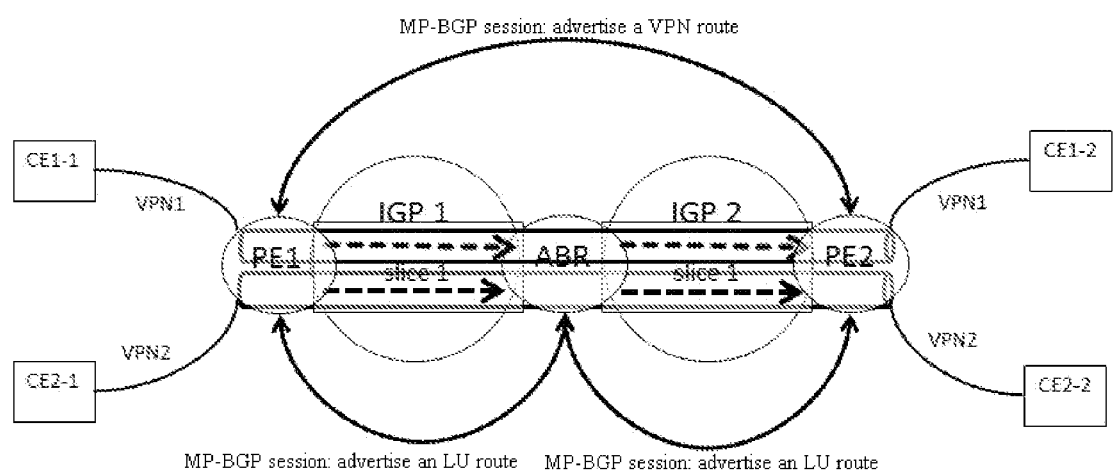
FIG. 13 is a structure diagram of a path construction system according to example embodiment ten of the present disclosure.
Figure 14:
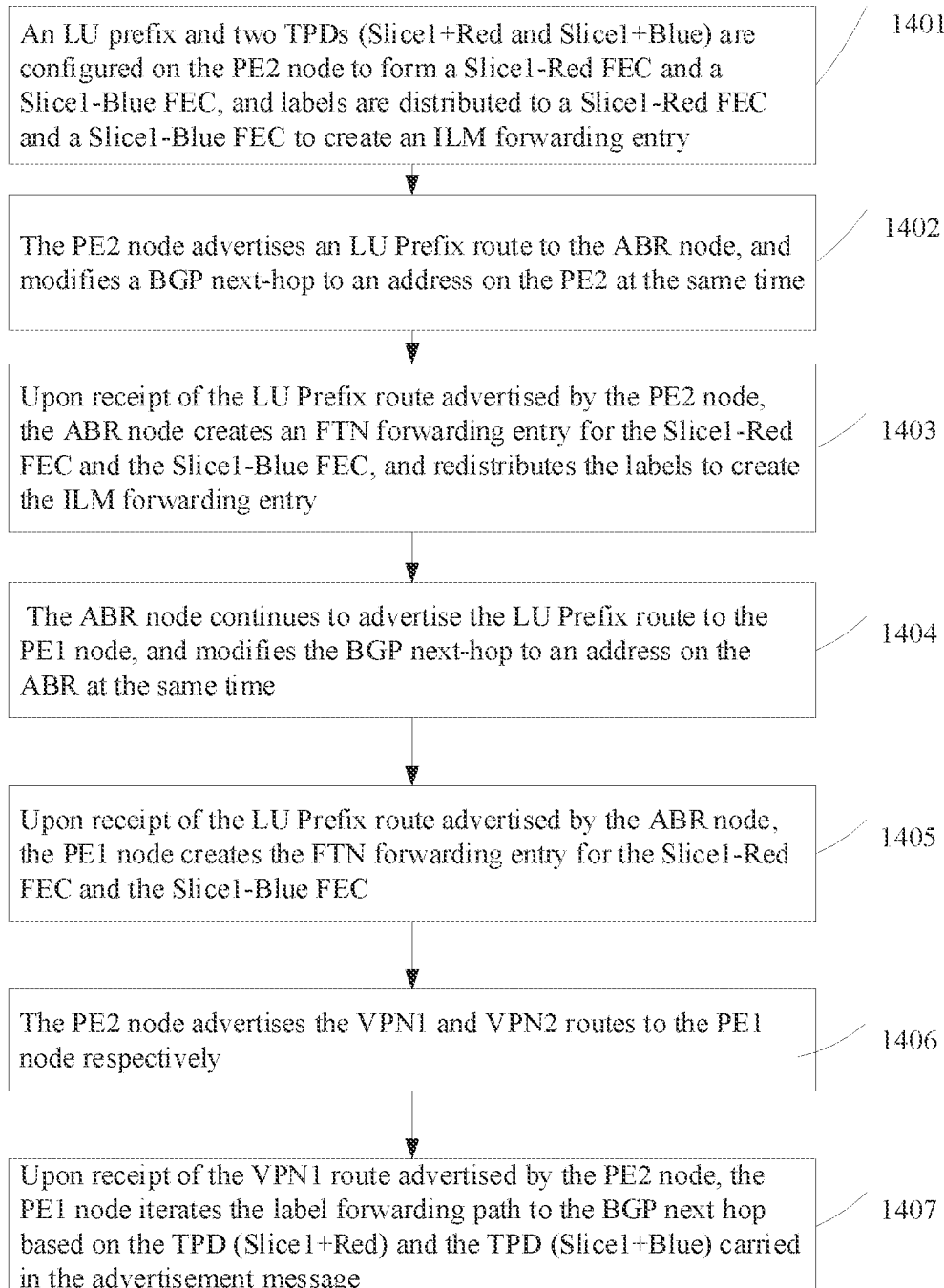
FIG. 14 is a flow chart of a path construction method according to example embodiment ten of the present disclosure.

FIG. 13 is a structure diagram of a path construction system according to example embodiment ten of the present disclosure, and FIG. 14 is a flow chart of a path construction method according to example embodiment ten of the present disclosure.

Example embodiment ten describes the construction of an end-to-end transmission path on a BGP-LU path by selecting a TE label forwarding path identified by Color in a Network Slice. In an MPLS network shown in FIG. 13, a Customer Edge Router (CE) 1-1 and a CE 1-2 are sites of a VPN1, and a CE2-1 and a CE 2-2 are sites of a VPN2. An IGP-enabled network exists between an ABR node and a PE1 node, and between the ABR node and a PE2 node, a BGP session is established between the PE1 node and the ABR node and between the ABR node and the PE2 node for advertising an LU route, while a BGP session is established between the PE1 node and the PE2 node for advertising a VPN route. As shown in FIG. 14, when creating the VPN1 and the VPN2 on the PE1 node and the PE2 node according to the user's needs, the method for constructing a path for the PE1 node to send traffic flows to the PE2 node according to example embodiment ten of the present disclosure includes following steps S1401 to S1407.

At step S1401, an LU prefix and two TPDs (Slice1+Red and Slice1+Blue) are configured on the PE2 node to form a Slice1−Red FEC and a Slice1−Blue FEC, and a label is distributed to the Slice1−Red FEC and the Slice1−Blue FEC to create an ILM forwarding entry.

Before the step S1401, the Slice and the TE label forwarding path in the Slice meeting the requirements of the VPN1 and the VPN2 are created in an IGP1 network and an IGP2 network. The Red label forwarding path (the Red label forwarding path shown by the upper dashed line in FIG. 13) in the Slice1 is configured to meet the requirements of the VPN1 and the Blue label forwarding path (the Blue label forwarding path shown by the lower dashed line in FIG. 13) in the Slice2 is configured to meet the requirements of the VPN2.

In case of SR, a Slice1−Red Prefix SID and a Slice1−Blue Prefix SID are also distributed to the PE2 node.

The labels are distributed to the Slice1−Red FEC and the Slice1−Blue FEC, respectively to create the ILM forwarding entry without enabling Penultimate Hop Popping (PHP).

At step S1402, the PE2 node advertises an LU Prefix route to the ABR node, and modifies a BGP next-hop to an address on the PE2 at the same time.

An advertisement message of the LU Prefix route carries the TPD (Slice1+Red), the TPD (Slice1+Blue), and the labels distributed for the Slice1−Red FEC and the Slice1−Blue FEC.

Particularly, the advertisement message carries a TPD attribute that carries two TLVs. One TLV carries a Network Slice ID Sub-TLV (ID is 1), a Color Sub-TLV (Color is Red), and a Label Sub-TLV (a label corresponding to the Slice1-Red FEC). The other TLV carries a Network Slice ID Sub-TLV (ID is 1), a Color Sub-TLV (Color is Blue) and a Label Sub-TLV (a label corresponding to the Slice1-Blue FEC).

The PE2 node may also advertise the LU Prefix route of the VPN1 and the LU Prefix route of the VPN2 to the ABR node, respectively.

In case of SR, the advertisement message also carries a Label-Index Sub-TLV (Slice1-Red Prefix SID) and a Label-Index Sub-TLV (Slice1-Blue Prefix SID).

The message of the LU Prefix route may be carried in an MP-BGP Update message, and specifically may carry the TPD attribute by extending a NLRI field.

At step S1403, upon receipt of the LU Prefix route advertised by the PE2 node, the ABR node creates an FTN forwarding entry for the Slice1-Red FEC and the Slice1-Blue FEC, and redistributes the labels to create the ILM forwarding entry.

The FTN forwarding entry and the ILM forwarding entry are associated with the TE label forwarding path identified by the Slice+color to the BGP next hop.

At step S1404, the ABR node continues to advertise the LU Prefix route to the PE1 node, and modifies the BGP next-hop to an address on the ABR at the same time.

The ABR node replaces the Slice1-Red FEC and Slice1-Blue FEC labels in the TPD TLV carried in the route message with the Slice1-Red FEC and Slice1-Blue FEC labels redistributed by the ABR node and forwards the labels to the PE1 node.

At step S1405, upon receipt of the LU Prefix route advertised by the ABR node, the PE1 node creates the FTN forwarding entry for the Slice1-Red FEC and the Slice1-Blue FEC.

The FTN forwarding entry is associated with the TE label forwarding path identified by the Slice+color to the BGP next hop.

At step S1406, the PE2 node advertises the VPN1 and VPN2 routes to the PE1 node respectively.

The advertisement message of the VPN route carries the TPD (Slice1+Red) and the TPD (Slice1+Blue). Specifically, the message advertising the VPN1 route carries the TPD attribute that carries one TLV carrying the Network Slice ID Sub-TLV (ID is 1) and a Color Sub-TLV (Color is Red), and the message advertising the VPN2 route carries the TPD attribute that carries one TLV carrying the Network Slice ID Sub-TLV (ID is 1) and the Color Sub-TLV (Color is Blue). The VPN1 route and the VPN2 route may also be carried in one advertisement message for transmission.

The advertisement message of the VPN route may be carried in the MP-BGP Update message, and specifically may carry the TPD attribute by extending the NLRI field.

At step S1407, upon receipt of the VPN1 route advertised by the PE2 node, the PE1 node iterates the label forwarding path to the BGP next hop based on the TPD (Slice1+Red) and the TPD (Slice1+Blue) carried in the advertisement message.

Specifically, the Slice1-Red FEC may be formed by the TPD (Slice1-Red) and the BGP next hop carried in the message, and the label forwarding path to the VPN1 Prefix is found by the Slice1-Red FEC. The Slice1-Blue FEC is formed by the TPD (Slice1-Blue) and the BGP next hop carried in the message, and the label forwarding path to the VPN2 Prefix is found by the Slice1-Blue FEC.

Example embodiment ten of the present disclosure provides technical schemes to construct end-to-end transmission paths meeting the requirements of the VPN1 and VPN2 for the VPN1 and VPN2, respectively.

Example Embodiment Eleven

Figure 15:
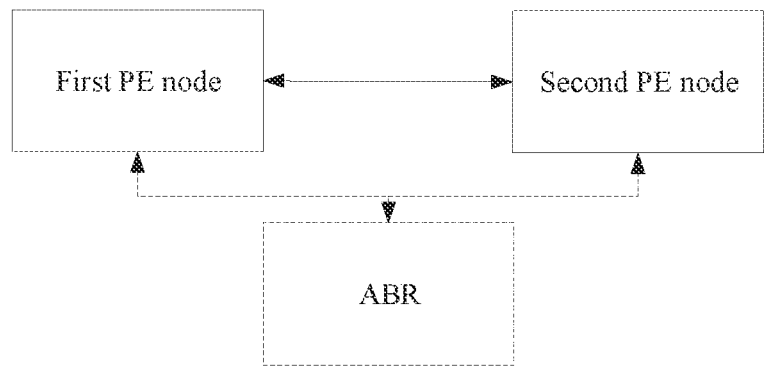
FIG. 15 is a structure diagram of a system for constructing a transmission path according to example embodiment eleven of the present disclosure.

FIG. 15 is a structure diagram of a system for constructing a transmission path according to example embodiment eleven of the present disclosure. As shown in FIG. 15, the system includes a second PE node and a first PE node.

The second PE node is configured to advertise a first VPN route to a first PE node through an MP-BGP signaling channel.

The first PE node is configured to determine a label forwarding path to a first VPN Prefix based on a first transmission path descriptor (TPD) carried in the first VPN route received.

The first TPD is configured to identify the label forwarding path for a first VPN message to reach a BGP next hop.

The system further includes an Area Border Router (ABR).

The second PE node is further configured to advertise a first BGP-LU route to the first PE node by the ABR through the MP-BGP signaling channel.

The first PE node is further configured to create a first FTN forwarding entry corresponding to a first FEC based on the first BGP-LU route received, and the first FTN forwarding entry is associated with a label forwarding path of the first VPN message identified by the first TPD to BGP next hop.

The first BGP-LU route carries the first TPD and a label corresponding to the first FEC, and the first FEC consists of the first TPD and a first prefix configured by the second PE node for the first BGP-LU route.

The second PE node is configured to distribute a first label to the first FEC to create a first ILM forwarding entry; and to send an advertisement message of the first BGP-LU route to the ABR and modifies the BGP next-hop to an address of the second PE node. The advertisement message of the first BGP-LU Prefix route carries the first TPD and the first label.

The ABR is configured to create a second FTN forwarding entry corresponding to the first FEC based on the advertisement message of the first BGP-LU route received, where the second FTN forwarding entry is associated with the label forwarding path identified by the first TPD for the first VPN message to reach the BGP next hop; to redistribute a second label to the first FEC to create a second ILM forwarding entry based on the second label; and to replace the first label in the advertisement message of the first BGP-LU route with the second label, modify the BGP next-hop to an address of the ABR and forward the address to the first PE node.

The second node is further configured to advertise a second VPN route to the first PE node through the MP-BGP signaling channel.

The first PE node is further configured to determine the label forwarding path to a second VPN Prefix based on the second TPD carried in the second VPN route received.

The second TPD is configured to identify the label forwarding path for a second VPN message to reach the BGP next hop.

The second node is further configured to advertise a second BGP-LU route to the first PE node by the ABR through the MP-BGP signaling channel before the second PE node advertises the second VPN route to the first PE node through the MP-BGP signaling channel.

The first node is further configured to create a third FTN forwarding entry corresponding to the second FEC based on the second BGP-LU route received. The third FTN forwarding entry is associated with the label forwarding path identified by the second TPD for the second VPN message to reach the BGP next hop.

The second BGP-LU route carries the second TPD and a label corresponding to the second FEC, and the second FEC consists of the second TPD and a second prefix configured by the second PE node for the second BGP-LU route.

The second node is configured to distribute a third label to the second FEC to create a third ILM forwarding entry; and to send an advertisement message of the second BGP-LU route to the ABR and modifies the BGP next-hop to the address of the second PE node. The advertisement message of the second BGP-LU Prefix route carries the second TPD and the third label.

The ABR is configured to: create a fourth FTN forwarding entry corresponding to the second FEC based on the advertisement message of the second BGP-LU route received, where the fourth FTN forwarding entry is associated with the label forwarding path identified by the second TPD for the second VPN message to reach the BGP next hop; redistribute a fourth label to the second FEC to create a fourth ILM forwarding entry based on the fourth label; replace the third label in the advertisement message of the second BGP-LU route with the fourth label, and modify the BGP next-hop to the address of the ABR and forwarding the address to the first PE node.

The format of the TPD is TLV, including TPD Type and Sub-TLV, the TPD Type is configured to identify which Sub-TLVs constitute the TPD, and the Sub-TLV includes one or more Sub-TLVs constituting the TPD.

The TPD Type includes following types:
Type 1, which means that the TPD is constituted of Color Sub-TLVs, and is configured to identify a label forwarding path identified by Color to the BGP next hop;
Type 2, which means that the TPD is constituted of IGP Prefix Algorithm Sub-TLVs, and is configured to identify a label forwarding path based on a specified Algorithm to the BGP next hop;
Type 3, which means that the TPD is constituted of Network Slice ID Sub-TLVs, and is configured to identify a label forwarding path in a network slice to the BGP next hop;
Type 4, which means that the TPD is constituted of Network Slice ID Sub-TLVs and Color Sub-TLVs, and is configured to identify a label forwarding path identified by Color in a specified network slice to the BGP next hop;
Type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop;
Type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

Figure 16:
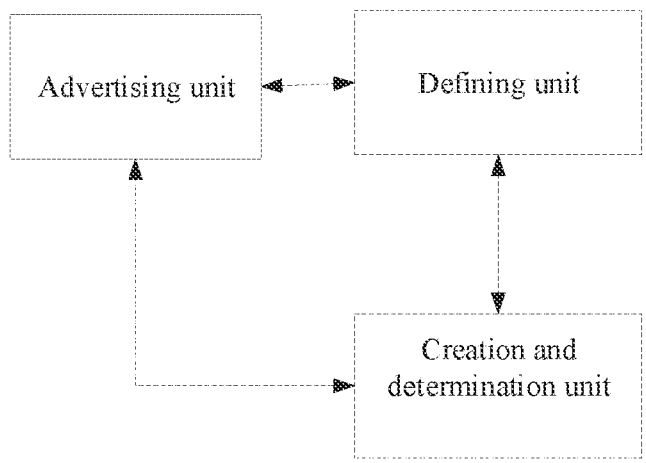
FIG. 16 is a structure diagram of a second PE node according to example embodiment eleven of the present disclosure.

FIG. 16 is a structure diagram of a second PE node according to example embodiment eleven of the present disclosure. As shown in FIG. 16, the second PE node includes an advertising unit.

The advertising unit is configured to advertise a first VPN route to a first PE node through an MP-BGP signaling channel, such that the first PE node determines a label forwarding path to a first VPN Prefix based on a first transmission path descriptor (TPD) carried in the first VPN route received.

The first TPD is configured to identify the label forwarding path for a first VPN message to reach a BGP next hop.

The second PE node further includes a defining unit and a creation and determination unit.

The defining unit is configured to predefine a plurality of TPDs each corresponding to an underlying transmission paths supporting a VPN service.

The creation and determination unit is configured to create a first VPN with the first PE node, and determine a first TPD based on the underlying transmission path meeting the service requirements of the first VPN.

The underlying transmission path includes one of a tunnel, a network slice, an IGP Prefix Algorithm, a specified tunnel in the network slice, a specified Algorithm in the network slice, and a specified tunnel in the network slice based on the specified Algorithm.

The advertising unit is further configured to advertise the first BGP-LU route to the first PE node by the ABR through the MP-BGP signaling channel before advertising the first VPN route to the first PE node, such that the first PE node creates a first FTN forwarding entry corresponding to a first FEC based on the first BGP-LU route received, and the first FTN forwarding entry is associated with the label forwarding path identified by the first TPD for the first VPN message to reach the BGP next hop.

The first BGP-LU route carries the first TPD and a label corresponding to the first FEC, and the first FEC consists of the first TPD and a first prefix configured by the second PE node for the first BGP-LU route.

The advertising unit is configured to distribute a first label to the first FEC to create a first ILM forwarding entry; and to send an advertisement message of the first BGP-LU route to the ABR and modifies the BGP next-hop to an address of the second PE node. The advertisement message of the first BGP-LU Prefix route carries the first TPD and the first label.

The advertising unit is further configured to advertise a second VPN route to the first PE node through the MP-BGP signaling channel, such that the first PE node determines a label forwarding path to a second VPN Prefix based on a second TPD carried in the second VPN route received.

The second TPD is configured to identify the label forwarding path for a second VPN message to reach the BGP next hop.

The creation and determination unit are further configured to create a second VPN with the first PE node, and determine a second TPD based on the underlying transmission path meeting the service requirements of the second VPN.

The advertising unit is further configured to, before the second PE node advertises the second VPN route to the first PE node through the MP-BGP signaling channel, the method further includes following steps.

The second PE node advertises a second BGP-LU route to the first PE node by the ABR through the MP-BGP signaling channel, such that the first PE node creates a third FTN forwarding entry corresponding to a second FEC based on the second BGP-LU route received, and the third FTN forwarding entry is associated with the label forwarding path identified by the second TPD for the second VPN message to reach the BGP next hop.

The second BGP-LU route carries the second TPD and a label corresponding to the second FEC, and the second FEC consists of the second TPD and a second prefix configured by the second PE node for the second BGP-LU route.

The advertising unit is configured to distribute a third label to the second FEC to create a third ILM forwarding entry; and to send an advertisement message of the second BGP-LU route to the ABR and modifies the BGP next-hop to the address of the second PE node. The advertisement message of the second BGP-LU Prefix route carries the second TPD and the third label.

The format of the TPD is TLV, including TPD Type and Sub-TLV, the TPD Type is configured to identify which Sub-TLVs constitute the TPD, and the Sub-TLV includes one or more Sub-TLVs constituting the TPD.

The TPD Type includes following types:

Type 1, which means that the TPD is constituted of Color Sub-TLVs, and is configured to identify a label forwarding path identified by Color to the BGP next hop;

Type 2, which means that the TPD is constituted of IGP Prefix Algorithm Sub-TLVs, and is configured to identify a label forwarding path based on a specified Algorithm to the BGP next hop;

Type 3, which means that the TPD is constituted of Network Slice ID Sub-TLVs, and is configured to identify a label forwarding path in a network slice to the BGP next hop;

Type 4, which means that the TPD is constituted of Network Slice ID Sub-TLVs and Color Sub-TLVs, and is configured to identify a label forwarding path identified by Color in a specified network slice to the BGP next hop;

Type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop;

Type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

Figure 17:
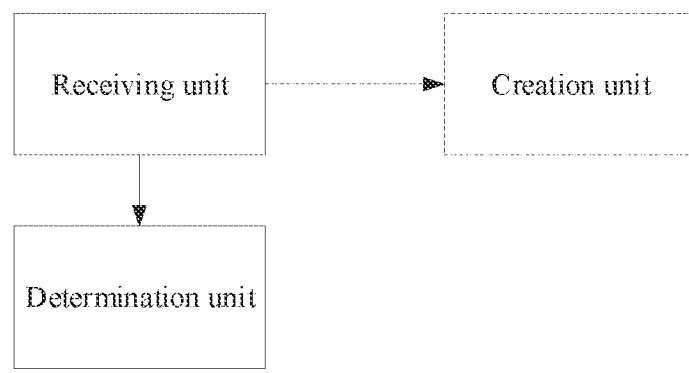
FIG. 17 is a structure diagram of a first PE node according to example embodiment eleven of the present disclosure.

FIG. 17 is a structure diagram of a first PE node according to example embodiment eleven of the present disclosure. As shown in FIG. 17, the first PE node includes a receiving unit and a determination unit.

The receiving unit is configured to receive a first VPN route advertised by a second PE node through an MP-BGP signaling channel.

The first VPN route carries a first transmission path descriptor (TPD) configured to identify a label forwarding path for a first VPN message to reach a BGP next hop.

The determination unit is configured to determine the label forwarding path to a first VPN Prefix based on the first TPD carried in the first VPN route received.

The receiving unit is further configured to, before receiving the first VPN route advertised by the second PE node through the MP-BGP signaling channel, receive a first BGP-LU route advertised by the second PE node by an ABR through the MP-BGP signaling channel.

The first BGP-LU route carries the first TPD and a label corresponding to the first FEC, and the first FEC consists of the first TPD and a first prefix configured by the second PE node for the first BGP-LU route.

The first PE node further includes a creation unit.

The creation unit is configured to create a first FTN forwarding entry corresponding to the first FEC based on the first BGP-LU route received. The first FTN forwarding entry is associated with the label forwarding path identified by the first TPD for the first VPN message to reach the BGP next hop.

The receiving unit is further configured to receive a second VPN route advertised by the second PE node through the MP-BGP signaling channel. The second VPN route carries a second TPD configured to identify the label forwarding path for a second VPN message to reach the BGP next hop.

The determination unit is further configured to determine the label forwarding path to a second VPN Prefix based on the second TPD carried in the second VPN route received.

The receiving unit is further configured to, before receiving the second VPN route advertised by the second PE node through the MP-BGP signaling channel, receive a second BGP-LU route advertised by the second PE node by the ABR through the MP-BGP signaling channel.

The second BGP-LU route carries the second TPD and a label corresponding to the second FEC, and the second FEC consists of the second TPD and a second prefix configured by the second PE node for the second BGP-LU route.

The creation unit is further configured to create a third FTN forwarding entry corresponding to the second FEC based on the second BGP-LU route received. The third FTN forwarding entry is associated with the label forwarding path identified by the second TPD for the second VPN message to reach the BGP next hop.

The determination unit is configured to obtain the first FEC based on the first TPD, and iterate the label forwarding path to the first VPN Prefix based on the first FEC.

Alternatively, the unit is configured to obtain the second FEC based on the second TPD, and iterate the label forwarding path to the second VPN Prefix based on the second FEC.

Figure 18:
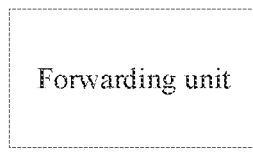
FIG. 18 is a structure diagram of an Area Border Router (ABR) according to example embodiment eleven of the present disclosure.

FIG. 18 is a structure diagram of an Area Border Router (ABR) according to example embodiment eleven of the present disclosure. As shown in FIG. 18, the ABR includes a forwarding unit.

The forwarding unit is configured to forward a first BGP-LU route advertised by a second PE node to a first PE node through an MP-BGP signaling channel, such that the first PE node creates a first FTN forwarding entry corresponding to a first FEC based on the first BGP-LU route received, and the first FTN forwarding entry is associated with a label forwarding path identified by the first TPD for a first VPN message to reach a BGP next hop.

The first BGP-LU route carries the first TPD and a label corresponding to the first FEC, and the first FEC consists of the first TPD and a first prefix configured by the second PE node for the first BGP-LU route.

The forwarding unit is configured to receive an advertisement message of the first BGP-LU route from the second PE node, where the advertisement message of the first BGP-LU route carries the first TPD and a first label distributed by the second PE for the first FEC; to create a second FTN forwarding entry corresponding to the first FEC based on the advertisement message of the first BGP-LU route received, where the second FTN forwarding entry is associated with the label forwarding path identified by the first TPD for the first VPN message to reach the BGP next hop; to redistribute a second label to the first FEC to create a second ILM forwarding entry based on the second label; and to replace the first label in the advertisement message of the first BGP-LU route with the second label, modify the BGP next-hop to an address of the ABR and forward the address to the first PE node.

The forwarding unit is further configured to forward a second BGP-LU route advertised by the second PE node to the first PE node through the MP-BGP signaling channel, such that the first PE node creates a third FTN forwarding entry corresponding to a second FEC based on the second BGP-LU route received, and the third FTN forwarding entry is associated with a label forwarding path identified by a second TPD for a second VPN message to reach the BGP next hop.

The second BGP-LU route carries the second TPD and a label corresponding to the second FEC, and the second FEC consists of the second TPD and a second prefix configured by the second PE node for the second BGP-LU route.

The forwarding unit is configured to receive an advertisement message of the second BGP-LU route from the second PE node, where the advertisement message of the second BGP-LU Prefix route carries the second TPD and the third label distributed by the second PE for the second FEC; to create a fourth FTN forwarding entry corresponding to the second FEC based on the advertisement message of the second BGP-LU route received, where the fourth FTN forwarding entry is associated with the label forwarding path identified by the second TPD for the second VPN message to reach the BGP next hop; redistribute a fourth label to the second FEC to create a fourth ILM forwarding entry based on the fourth label; and to replace the third label in the advertisement message of the second BGP-LU route with the fourth label, modify the BGP next-hop to an address of the ABR, and forward the address to the first PE node.

The embodiment of the present disclosure further provides a second PE node, including a memory, a processor, and a computer program stored in the memory and executable on the processor. The computer program, when executed by the processor, causes the processor to perform any one of the above methods for constructing a transmission path.

The embodiment of the present disclosure further provides a first PE node, including a memory, a processor, and a computer program stored in the memory and executable on the processor. The computer program, when executed by the processor, causes the processor to perform any one of the above methods for constructing a transmission path.

The embodiment of the present disclosure further provides an Area Border Router (ABR), including a memory, a processor, and a computer program stored in the memory and executable on the processor. The computer program, when executed by the processor, causes the processor to perform any one of the above methods for constructing a transmission path.

The embodiment of the present disclosure further provides a computer-readable storage medium storing an information processing program which, when executed by a processor, causes the processor to perform any one of the above methods for constructing a transmission path.

Compared with related technologies, the embodiments of the present disclosure provide a path construction method and related devices. One of the methods includes: advertising a first VPN route to a first PE node by a second PE node through an MP-BGP signaling channel, such that the first PE node determines a label forwarding path to a first VPN Prefix based on a first transmission path descriptor (TPD) carried in the first VPN route received. The first TPD is configured to identify a label forwarding path for a first VPN message to reach a BGP next hop. In this way, the underlying transmission path meeting the service requirements can be selected for VPN services.

Those having ordinary skills in the art will appreciate that all or some of the steps, systems, functional modules/units in the apparatus disclosed above may be implemented as software, firmware, hardware, and appropriate combinations thereof. In a hardware implementation, partitioning between functional modules/units mentioned in the above description does not necessarily correspond to partitioning of physical components; For example, a physical component may have multiple functions, or a function or step may be performed by several physical components in cooperation. Some or all components may be implemented as software executed by a processor, such as a digital signal processor or a microprocessor, or as hardware, or as an integrated circuit, such as an application-specific integrated circuit. Such software may be distributed over computer-readable medium, which may include computer storage medium (or non-transitory medium) and communication medium (or transitory medium). As known to those having ordinary skills in the art, the term computer storage medium includes volatile and non-volatile, removable and non-removable medium implemented in any method or technique for storing information, such as computer-readable instructions, data structures, program modules or other data. Computer storage medium include, but are not limited to, RAMs, ROMs, EEPROMs, flash memory or other memory technologies, CD-ROM, digital versatile disks (DVDs) or other optical disk storage, magnetic cassettes, magnetic tapes, magnetic disk storage or other magnetic storage devices, or any other medium that may be used to store desired information and that may be accessed by a computer. Furthermore, as is well known to those having ordinary skills in the art, a communication medium typically contains computer-readable instructions, data structures, program modules, or other data in a modulated data signal such as a carrier wave or other transmission mechanism, and may include any information delivery medium.

Several embodiments of the present disclosure are described above, which are used to facilitate understanding of the present disclosure and are not intended to limit the present disclosure. Any person having ordinary skills in the art may make any modifications and changes in forms and details of practice without departing from the nature and scope of the present disclosure of the present disclosure, provided that the scope of protection of the present disclosure shall be defined by the appended claims.

The invention claimed is:

1. A path construction method, comprising:
predefining a plurality of transmission path descriptors (TPDs), wherein each TPD corresponds to an underlying transmission path supporting a Virtual Private Network (VPN) service;
creating, by a second Provider Edge (PE) node, a first VPN with a first PE node, and determining a first TPD based on an underlying transmission path meeting a service requirement of the first VPN;
advertising, by the second PE node, a first Border Gateway Protocol Labeled Unicast (BGP-LU) route to the first PE node by an Area Border Router (ABR) through a Multiprotocol Border Gateway Protocol (MP-BGP) signaling channel, such that the first PE node is able to create a first Forwarding Equivalence Class to Next Hop Label Forwarding Entry Map (FTN) forwarding entry corresponding to a first Forwarding Equivalence Class (FEC) based on the first BGP-LU route received, wherein the first FTN forwarding entry is associated with a label forwarding path identified by the first TPD for a first VPN message to reach a BGP next hop;

wherein the first BGP-LU route carries the first TPD and a label corresponding to the first FEC, and the first FEC consists of the first TPD and a first prefix configured by the second PE node for the first BGP-LU route;

advertising, by the second PE node, a first VPN route to the first PE node through the MP-BGP signaling channel, such that the first PE node is able to determine a label forwarding path to a first VPN Prefix based on the first TPD carried in the first VPN route received;

wherein the first TPD is configured to identify the label forwarding path for the first VPN message to reach the BGP next hop; and wherein the TPD is in a format of TLV comprising TPD Type and Sub-TLV, the TPD Type is configured to identify which Sub-TLVs constitute the TPD, and the Sub-TLV comprises one or more Sub-TLVs constituting the TPD.

2. The method of claim 1,
wherein the underlying transmission path is based on one of a tunnel, a network slice, an Interior Gateway Protocol (IGP) Prefix Algorithm, a specified tunnel in the network slice, a specified Algorithm in the network slice, and a specified tunnel in the network slice based on the specified Algorithm.

3. The method of claim 1, wherein advertising, by the second PE node, a first BGP-LU route to the first PE node by an ABR through the MP-BGP signaling channel comprises:

distributing, by the second PE node, a first label to the first FEC to create a first ILM forwarding entry;

sending, by the second PE node, an advertisement message of the first BGP-LU route to the ABR and modifying the BGP next-hop to an address of the second PE node, wherein the advertisement message of the first BGP-LU Prefix route carries the first TPD and the first label;

creating, by the ABR, a second FTN forwarding entry corresponding to the first FEC based on the advertisement message of the first BGP-LU route received, wherein the second FTN forwarding entry is associated with the label forwarding path identified by the first TPD for the first VPN message to reach the BGP next hop;

redistributing, by the ABR, a second label to the first FEC to create a second ILM forwarding entry based on the second label; and replacing, by the ABR, the first label in the advertisement message of the first BGP-LU route with the second label, modifying the BGP next-hop to an address of the ABR and forwarding the address to the first PE node.

4. The method of claim 1, further comprising:
advertising, by the second PE node, a second VPN route to the first PE node through the MP-BGP signaling channel, such that the first PE node is able to determine the label forwarding path to a second VPN Prefix based on a second TPD carried in the second VPN route received, wherein the second TPD is configured to identify the label forwarding path for a second VPN message to reach the BGP next hop.

5. The method of claim 4, wherein before advertising, by the second PE node, a second VPN route to the first PE node through the MP-BGP signaling channel, the method further comprises:

creating, by the second PE node, a second VPN with the first PE node and determining the second TPD based on the underlying transmission path meeting a service requirement of the second VPN.

6. The method of claim 4, wherein before advertising, by the second PE node, a second VPN route to the first PE node through the MP-BGP signaling channel, the method further comprises:

advertising, by the second PE node, a second BGP-LU route to the first PE node by the ABR through the MP-BGP signaling channel, such that the first PE node is able to create a third FTN forwarding entry corresponding to a second FEC based on the second BGP-LU route received, wherein the third FTN forwarding entry is associated with the label forwarding path identified by the second TPD for the second VPN message to reach the BGP next hop;

wherein the second BGP-LU route carries the second TPD and a label corresponding to the second FEC, and the second FEC consists of the second TPD and a second prefix configured by the second PE node for the second BGP-LU route.

7. The method of claim 6, wherein advertising, by the second PE node, a second BGP-LU route to the first PE node by the ABR through the MP-BGP signaling channel comprises:

distributing, by the second PE node, a third label to the second FEC to create a third ILM forwarding entry;

sending, by the second PE node, an advertisement message of the second BGP-LU route to the ABR and modifying the BGP next-hop to the address of the second PE node, wherein the advertisement message of the second BGP-LU Prefix route carries the second TPD and the third label;

creating, by the ABR, a fourth FTN forwarding entry corresponding to the second FEC based on the advertisement message of the second BGP-LU route received, wherein the fourth FTN forwarding entry is associated with the label forwarding path identified by the second TPD for the second VPN message to reach the BGP next hop;

redistributing, by the ABR, a fourth label to the second FEC to create a fourth ILM forwarding entry based on the fourth label; and replacing, by the ABR, the third label in the advertisement message of the second BGP-LU route with the fourth label, modifying the BGP next-hop to the address of the ABR and forwarding the address to the first PE node.

8. The method of claim 1, wherein
the TPD Type comprises:
type 1, which means that the TPD is constituted of Color Sub-TLVs, and is configured to identify a label forwarding path identified by Color to the BGP next hop;

type 2, which means that the TPD is constituted of IGP Prefix Algorithm Sub-TLVs, and is configured to identify a label forwarding path based on a specified Algorithm to the BGP next hop;

type 3, which means that the TPD is constituted of Network Slice ID Sub-TLVs, and is configured to identify a label forwarding path in a network slice to the BGP next hop;

type 4, which means that the TPD is constituted of Network Slice ID Sub-TLVs and Color Sub-TLVs, and is configured to identify a label forwarding path identified by Color in a specified network slice to the BGP next hop;

type 5, which means that the TPD is constituted of Network Slice ID Sub-TLV and IGP Prefix Algorithm Sub-TLVs, and is configured to identify a label forwarding path based on the specified Algorithm in the specified network slice to the BGP next hop; and type 6, which means that the TPD is constituted of Network Slice ID Sub-TLVs, IGP Prefix Algorithm Sub-TLVs and Color Sub-TLVs, and is configured to identify a TE label forwarding path identified by Color based on the specified Algorithm in the specified network slice to the BGP next hop.

9. A method for constructing a transmission path, comprising:

receiving, by a first Provider Edge (PE) node, a first Border Gateway Protocol Labeled Unicast (BGP-LU) route advertised by a second PE node by an Area Border Router (ABR) through a Multiprotocol Border Gateway Protocol (MP-BGP) signaling channel;

wherein the first BGP-LU route carries a first transmission path descriptor (TPD) and a label corresponding to a first Forwarding Equivalence Class (FEC), and the first FEC consists of the first TPD and a first prefix configured by the second PE node for the first BGP-LU route; and creating, by the first PE node, a first Forwarding Equivalence Class to Next Hop Label Forwarding Entry map (FTN) forwarding entry corresponding to the first FEC based on the first BGP-LU route received, wherein the first FTN forwarding entry is associated with a label forwarding path identified by the first TPD for a first Virtual Private Network (VPN) message to reach a BGP next hop;

receiving, by the first PE node, a first VPN route advertised by the second PE node through the MP-BGP signaling channel;

wherein the first VPN route carries the first TPD configured to identify the label forwarding path for the first VPN message to reach the BGP next hop; and determining, by the first PE node, the label forwarding path to a first VPN Prefix based on the first TPD carried in the first VPN route received; and wherein the TPD is in a format of TLV comprising TPD Type and Sub-TLV, the TPD Type is configured to identify which Sub-TLVs constitute the TPD, and the Sub-TLV comprises one or more Sub-TLVs constituting the TPD.

10. The method of claim 9, wherein receiving, by the first PE node, a first BGP-LU route advertised by the second PE node by an Area Border Router (ABR) through the MP-BGP signaling channel comprises:

distributing, by the second PE node, a first label to the first FEC to create a first ILM forwarding entry;

sending, by the second PE node, an advertisement message of the first BGP-LU route to the ABR and modifying the BGP next-hop to an address of the second PE node, wherein the advertisement message of the first BGP-LU Prefix route carries the first TPD and the first label;

creating, by the ABR, a second FTN forwarding entry corresponding to the first FEC based on the advertisement message of the first BGP-LU route received, wherein the second FTN forwarding entry is associated with the label forwarding path identified by the first TPD for the first VPN message to reach the BGP next hop;

redistributing, by the ABR, a second label to the first FEC to create a second ILM forwarding entry based on the second label; and replacing, by the ABR, the first label in the advertisement message of the first BGP-LU route with the second label, modifying the BGP next-hop to an address of the ABR and forwarding the address to the first PE node.

11. The method of claim 9, further comprising:

receiving, by the first PE node, a second VPN route advertised by the second PE node through the MP-BGP signaling channel, wherein the second VPN route carries a second TPD configured to identify the label forwarding path for a second VPN message to reach the BGP next hop; and determining, by the first PE node, the label forwarding path to a second VPN Prefix based on the second TPD carried in the second VPN route received.

12. The method of claim 11, wherein before receiving, by the first PE node, a second VPN route advertised by the second PE node through the MP-BGP signaling channel, the method further comprises:

receiving, by the first PE node, a second BGP-LU route advertised by the second PE node by the ABR through the MP-BGP signaling channel;

wherein the second BGP-LU route carries the second TPD and a label corresponding to the second FEC, and the second FEC consists of the second TPD and a second prefix configured by the second PE node for the second BGP-LU route; and creating, by the first PE node, a third FTN forwarding entry corresponding to the second FEC based on the second BGP-LU route received, wherein the third FTN forwarding entry is associated with the label forwarding path identified by the second TPD for the second VPN message to reach the BGP next hop.

13. The method of claim 12, wherein receiving, by the first PE node, a second BGP-LU route advertised by the second PE node by the ABR through the MP-BGP signaling channel comprises:

distributing, by the second PE node, a third label to the second FEC to create a third ILM forwarding entry;

sending, by the second PE node, an advertisement message of the second BGP-LU route to the ABR and modifying the BGP next-hop to the address of the second PE node, wherein the advertisement message of the second BGP-LU Prefix route carries the second TPD and the third label;

creating, by the ABR, a fourth FTN forwarding entry corresponding to the second FEC based on the advertisement message of the second BGP-LU route received, wherein the fourth FTN forwarding entry is associated with the label forwarding path identified by the second TPD for the second VPN message to reach the BGP next hop;

redistributing, by the ABR, a fourth label to the second FEC to create a fourth ILM forwarding entry based on the fourth label; and replacing, by the ABR, the third label in the advertisement message of the second BGP-LU route with the fourth label, modifying the BGP next-hop to the address of the ABR and forwarding the address to the first PE node.

14. The method of claim 9, wherein:

determining, by the first PE node, the label forwarding path to a first VPN Prefix based on the first TPD carried in the first VPN route received comprises:

obtaining, by the first PE node, the first FEC based on the first TPD, and iterating the label forwarding path to the first VPN Prefix based on the first FEC; or, determining, by the first PE node, the label forwarding path to a second VPN Prefix based on the second TPD carried in the second VPN route received comprises:
obtaining, by the first PE node, a second FEC based on the second TPD, and iterating the label forwarding path to the second VPN Prefix based on the second FEC.

15. A method for constructing a transmission path, comprising:
forwarding, by an Area Border Router (ABR), a first Border Gateway Protocol Labeled Unicast (BGP-LU) route advertised by a second Provider Edge (PE) node to a first PE node through an Multiprotocol Border Gateway Protocol (MP-BGP) signaling channel, such that the first PE node is able to create a first Forwarding Equivalence Class to Next Hop Label Forwarding Entry map (FTN) forwarding entry corresponding to a first Forwarding Equivalence Class (FEC) based on the first BGP-LU route received, wherein the first FTN forwarding entry is associated with a label forwarding path identified by a first transmission path descriptor (TPD) for a first Virtual Private Network (VPN) message to reach a BGP next hop;
wherein the first BGP-LU route carries the first TPD and a label corresponding to the first FEC, and the first FEC consists of the first TPD and a first prefix configured by the second PE node for the first BGP-LU route; and
wherein the TPD is in a format of TLV comprising TPD Type and Sub-TLV, the TPD Type is configured to identify which Sub-TLVs constitute the TPD, and the Sub-TLV comprises one or more Sub-TLVs constituting the TPD.

16. The method of claim 15, wherein forwarding, by the ABR, the first BGP-LU route advertised by the second PE node to the first PE node through the MP-BGP signaling channel comprises:
receiving, by the ABR, an advertisement message of the first BGP-LU route from the second PE node, wherein the advertisement message of the first BGP-LU Prefix route carries the first TPD and a first label distributed by the second PE for the first FEC;
creating, by the ABR, a second FTN forwarding entry corresponding to the first FEC based on the advertisement message of the first BGP-LU route received, wherein the second FTN forwarding entry is associated with the label forwarding path identified by the first TPD for the first VPN message to reach the BGP next hop;
redistributing, by the ABR, a second label to the first FEC to create a second ILM forwarding entry based on the second label; and
replacing, by the ABR, the first label in the advertisement message of the first BGP-LU route with the second label, modifying the BGP next-hop to an address of the ABR and forwarding the address to the first PE node.

17. The method of claim 15, further comprising:
forwarding, by the ABR, a second BGP-LU route advertised by the second PE node to the first PE node through the MP-BGP signaling channel, such that the first PE node is able to create a third FTN forwarding entry corresponding to a second FEC based on the second BGP-LU route received, and the third FTN forwarding entry is associated with a label forwarding path identified by a second TPD for a second VPN message to reach the BGP next hop;
wherein the second BGP-LU route carries the second TPD and a label corresponding to the second FEC, and the second FEC consists of the second TPD and a second prefix configured by the second PE node for the second BGP-LU route.

18. The method of claim 17, wherein forwarding, by the ABR, a second BGP-LU route advertised by the second PE node to the first PE node through the MP-BGP signaling channel comprises:
receiving, by the ABR, an advertisement message of the second BGP-LU route from the second PE node, wherein the advertisement message of the second BGP-LU Prefix route carries the second TPD and a third label distributed by the second PE for the second FEC;
creating, by the ABR, a fourth FTN forwarding entry corresponding to the second FEC based on the advertisement message of the second BGP-LU route received, wherein the fourth FTN forwarding entry is associated with the label forwarding path identified by the second TPD for the second VPN message to reach the BGP next hop;
redistributing, by the ABR, a fourth label to the second FEC to create a fourth ILM forwarding entry Abased on the fourth label; and
replacing, by the ABR, the third label in the advertisement message of the second BGP-LU route with the fourth label, modifying the BGP next-hop to the address of the ABR and forwarding the address to the first PE node.

19. A system for constructing a transmission path, comprising:
a second Provider Edge (PE) node, which is configured to advertise a first Virtual Private Network (VPN) route to a first PE node through an Multiprotocol Border Gateway Protocol (MP-BGP) signaling channel; and
the first PE node, which is configured to determine a label forwarding path to a first VPN Prefix based on a first transmission path descriptor (TPD) carried in the first VPN route received;
wherein the first TPD is configured to identify the label forwarding path for a first VPN message to reach a BGP next hop;
an Area Border Router (ABR);
wherein the second PE node is further configured to advertise a first Border Gateway Protocol Labeled Unicast (BGP-LU) route to the first PE node by the ABR through the MP-BGP signaling channel;
wherein the first PE node is further configured to create a first Forwarding Equivalence Class to Next Hop Label Forwarding Entry map (FTN) forwarding entry corresponding to a first Forwarding Equivalence Class (FEC) based on the first BGP-LU route received, and the first FTN forwarding entry is associated with a label forwarding path of the first VPN message identified by the first TPD to BGP next hop;
wherein the first BGP-LU route carries the first TPD and a label corresponding to the first FEC, and the first FEC consists of the first TPD and a first prefix configured by the second PE node for the first BGP-LU route; and
wherein the TPD is in a format of TLV comprising TPD Type and Sub-TLV, the TPD Type is configured to identify which Sub-TLVs constitute the TPD, and the Sub-TLV comprises one or more Sub-TLVs constituting the TPD.

* * * * *